US008767232B2

(12) United States Patent
Nakashio

(10) Patent No.: US 8,767,232 B2
(45) Date of Patent: Jul. 1, 2014

(54) IMAGE PROCESSING APPARATUS, IMAGE PROCESSING METHOD, AND COMPUTER-READABLE STORAGE MEDIUM

(75) Inventor: Hidekazu Nakashio, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 13/371,673

(22) Filed: Feb. 13, 2012

(65) Prior Publication Data
US 2012/0206756 A1 Aug. 16, 2012

(30) Foreign Application Priority Data

Feb. 16, 2011 (JP) ................ 2011-031040

(51) Int. Cl.
G06F 3/12 (2006.01)
G06K 9/40 (2006.01)
G06K 9/42 (2006.01)
G06K 15/00 (2006.01)
H04N 1/04 (2006.01)
H04N 1/40 (2006.01)

(52) U.S. Cl.
USPC ......... 358/1.14; 358/1.15; 358/447; 358/474; 382/254; 382/258

(58) Field of Classification Search
None
See application file for complete search history.

(56) References Cited

U.S. PATENT DOCUMENTS

| 5,485,288 | A  | * | 1/1996  | Kamei et al. | 358/530 |
|---|---|---|---|---|---|
| 6,067,377 | A  | * | 5/2000  | Hata | 382/167 |
| 8,514,418 | B2 | * | 8/2013  | Mitsuhashi et al. | 358/1.13 |
| 2001/0015815 | A1 | * | 8/2001 | Hada et al. | 358/1.9 |
| 2004/0057756 | A1 | * | 3/2004 | Taka et al. | 399/301 |
| 2004/0135878 | A1 | * | 7/2004 | Mizes et al. | 347/240 |
| 2005/0184235 | A1 | * | 8/2005 | Abe | 250/311 |
| 2006/0222419 | A1 | * | 10/2006 | Ishibashi et al. | 399/301 |
| 2008/0123141 | A1 | * | 5/2008 | Noguchi | 358/2.1 |
| 2008/0130061 | A1 | * | 6/2008 | Nakase et al. | 358/406 |
| 2008/0309703 | A1 | * | 12/2008 | Yamazaki | 347/19 |
| 2009/0085952 | A1 | * | 4/2009 | Yamazaki | 347/19 |

FOREIGN PATENT DOCUMENTS

JP 2010-113070 A 5/2010

* cited by examiner

Primary Examiner — Marivelisse Santiago Cordero
Assistant Examiner — Moustapha Diaby
(74) Attorney, Agent, or Firm — Canon USA Inc. IP Division

(57) ABSTRACT

An image processing apparatus determines one of a plurality of parameters as a parameter used for line width correction of an image based on a comparison between the images of the straight lines obtained by reading printed straight lines subjected to line width correction using the plurality of parameters and an image of a straight line as a reference image which is to be obtained by reading the straight line printed in a predetermined line width.

15 Claims, 21 Drawing Sheets

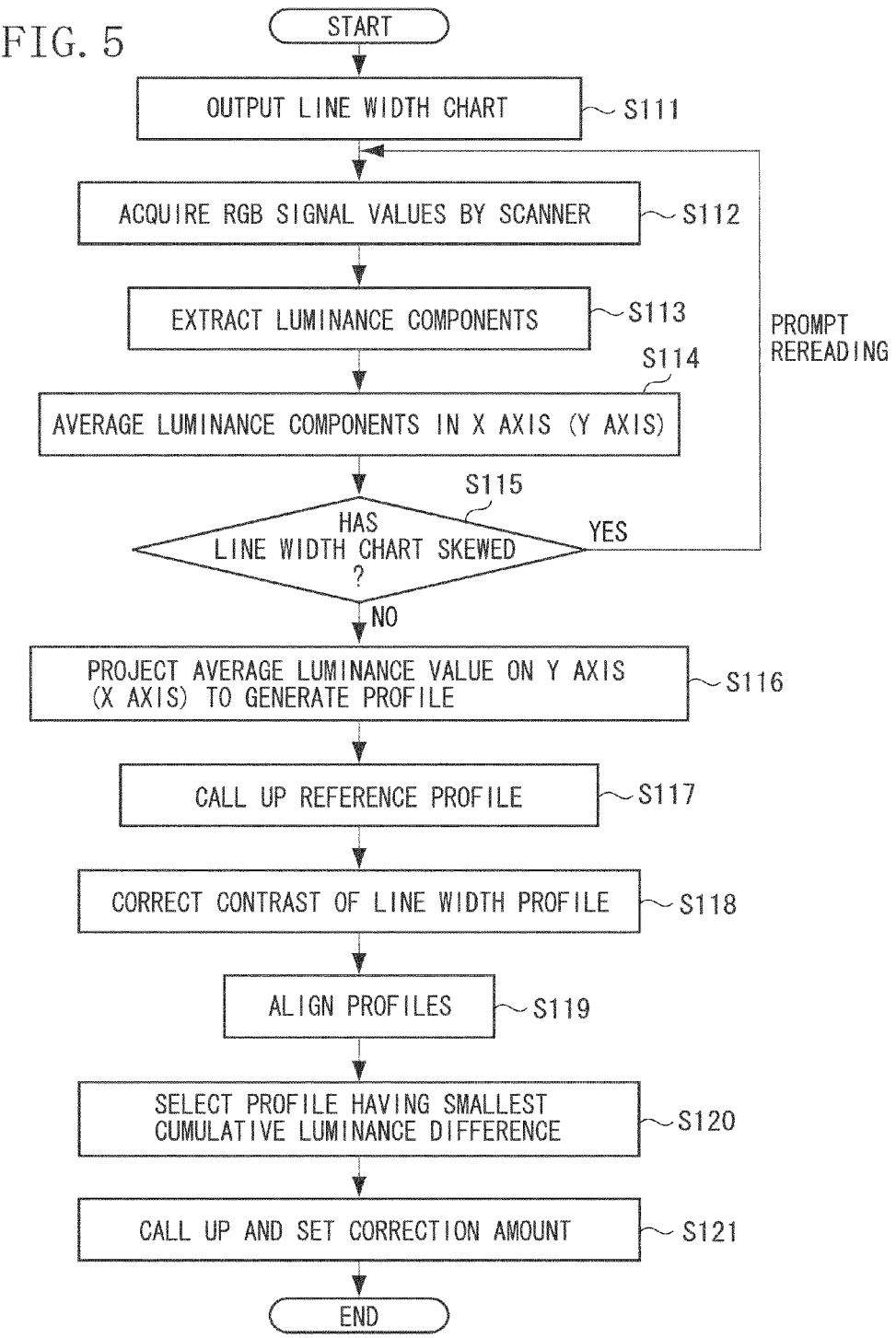

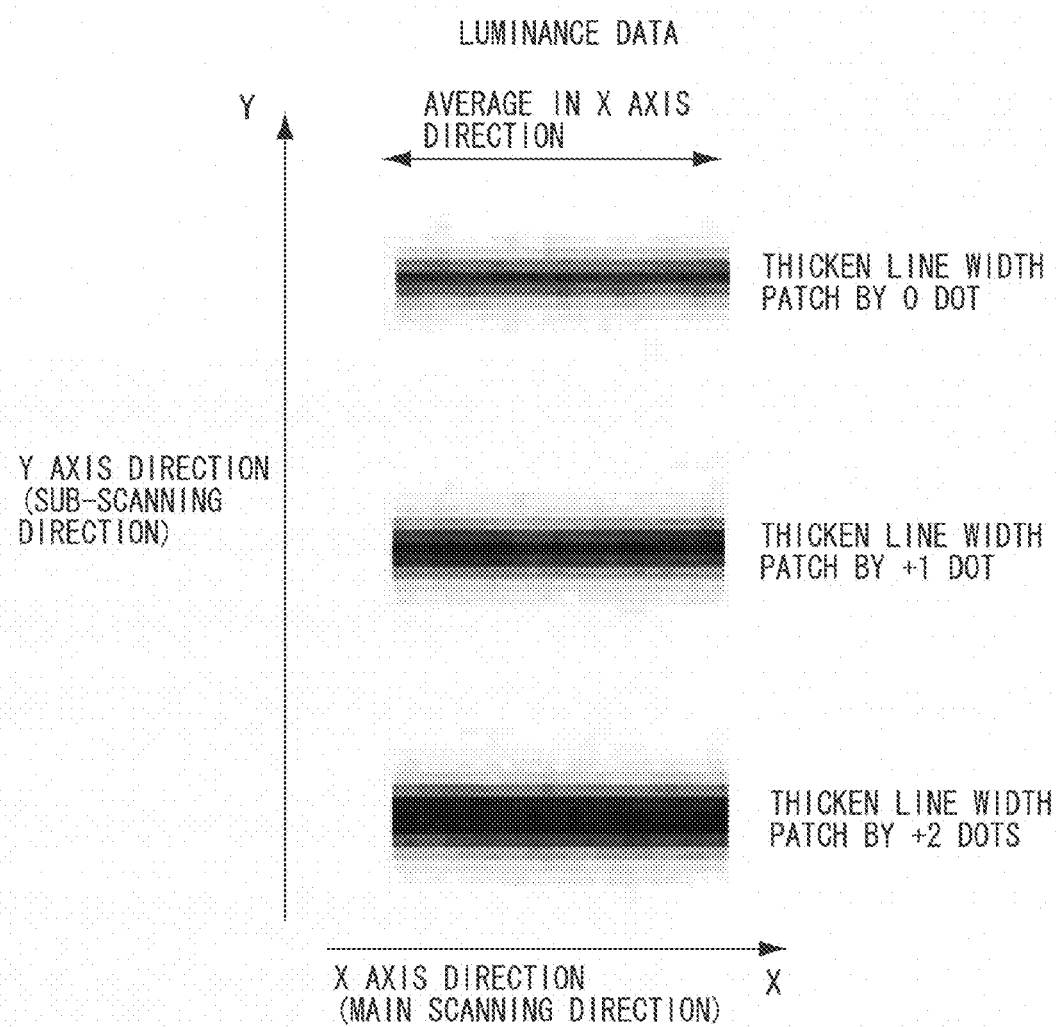

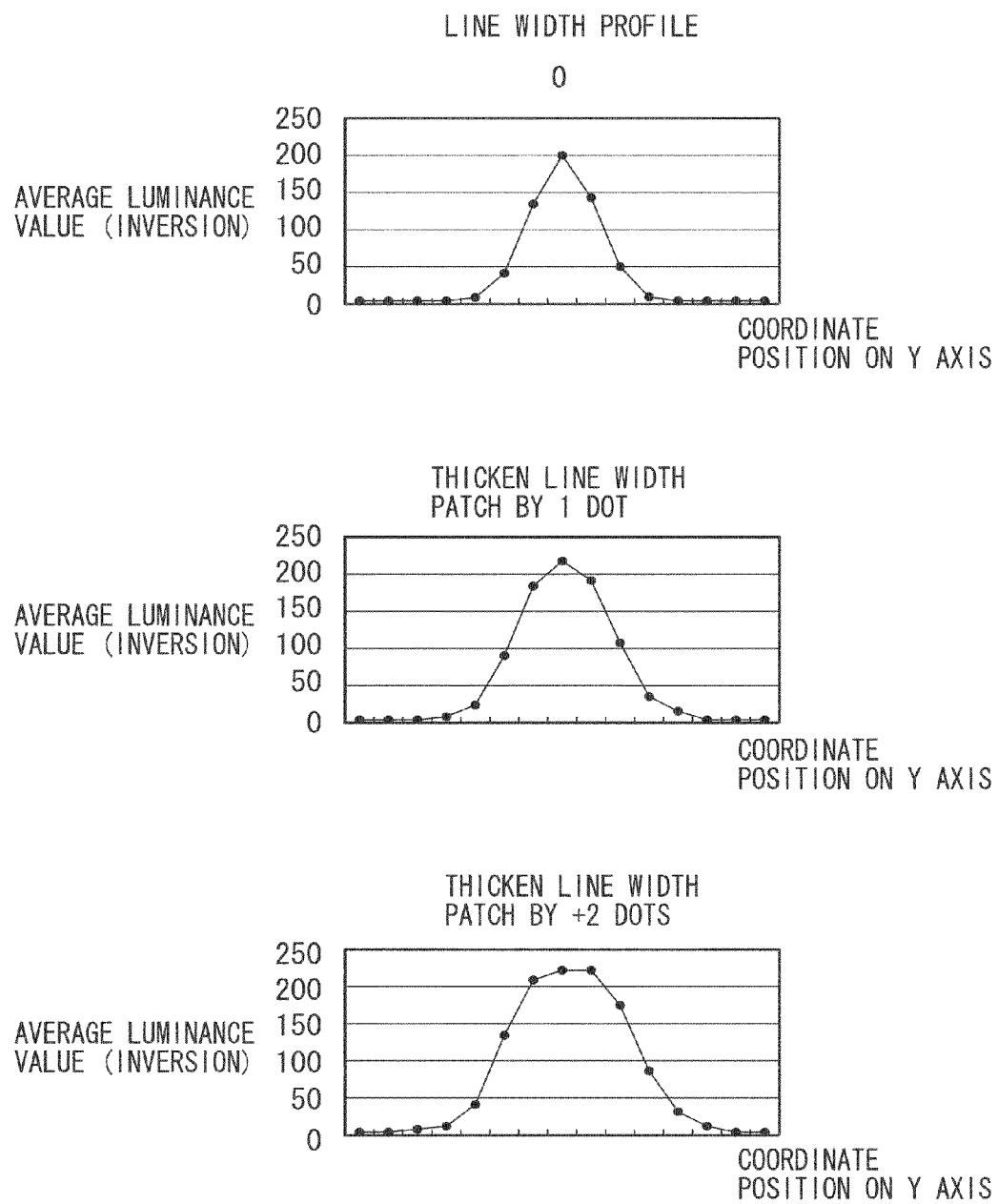

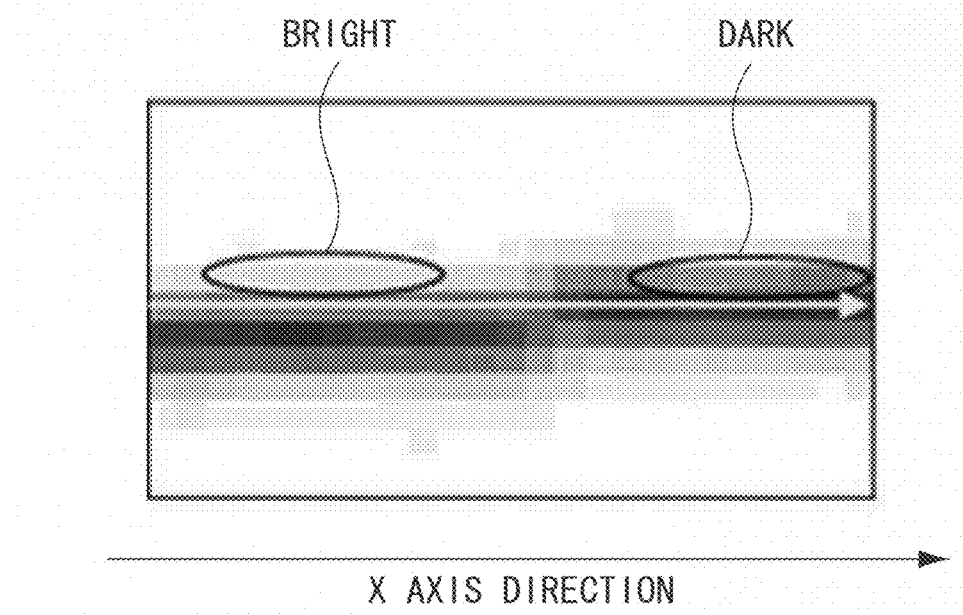

EXAMPLE IN WHICH PHASE DIFFERENCE OCCURS
WHEN THIN LINE HAVING SAME LINE WIDTH IS READ

|   | LEFT IMAGE | RIGHT IMAGE |       | LUMINANCE DIFFERENCE |
|---|---|---|---|---|
| 1 | 251 | 251 |       | 0 |
| 2 | 247 | 248 |       | −1 |
| 3 | 205 | 223 |       | −18 |
| 4 | 99  | 135 |       | −36 |
| 5 | 53  | 59  |       | −6 |
| 6 | 124 | 93  |       | 31 |
| 7 | 205 | 185 |       | 20 |
| 8 | 241 | 234 |       | 7 |
| 9 | 250 | 247 |       | 3 |
|   |     |     |       |   |
|   |     |     | TOTAL | 0 |

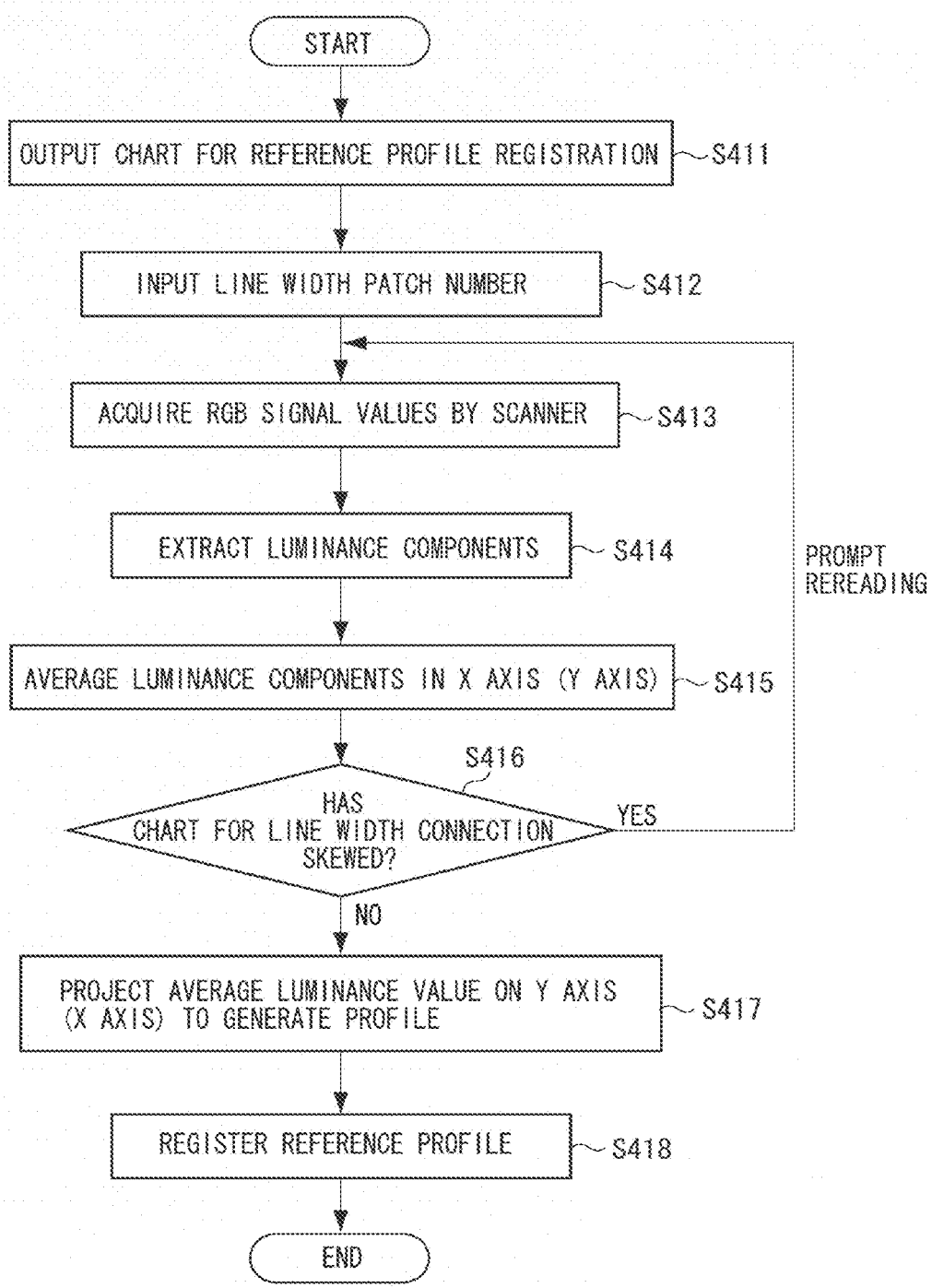

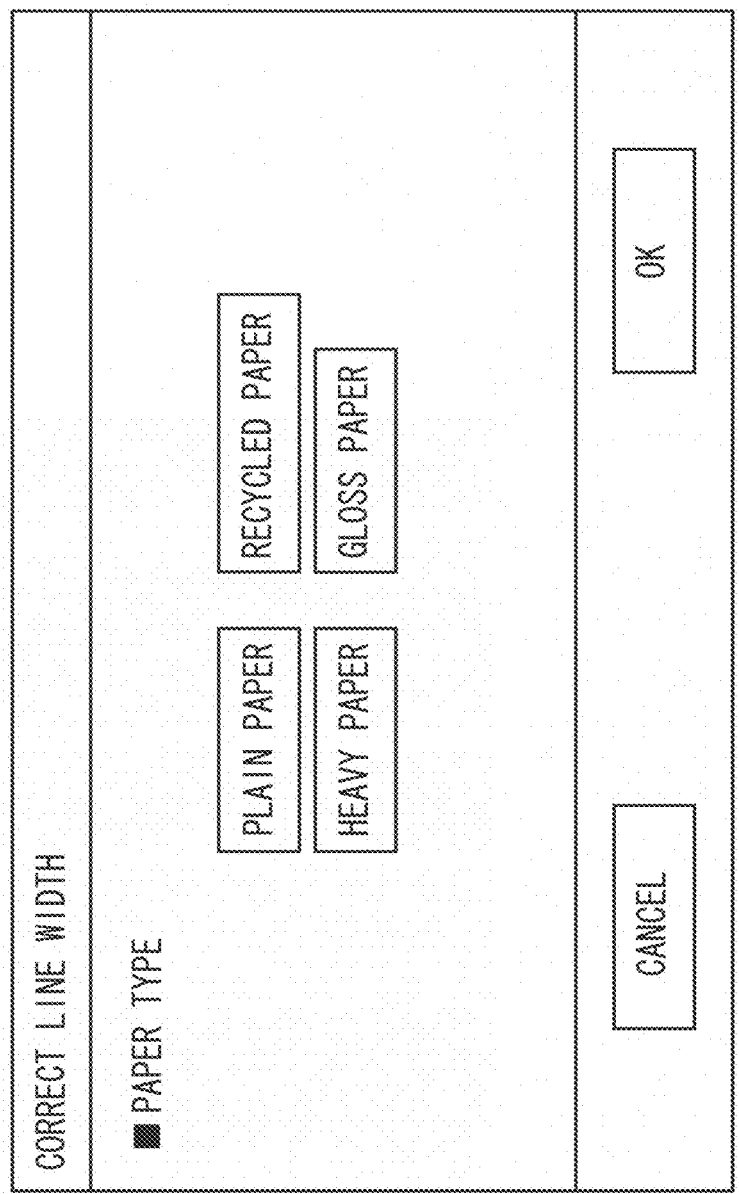

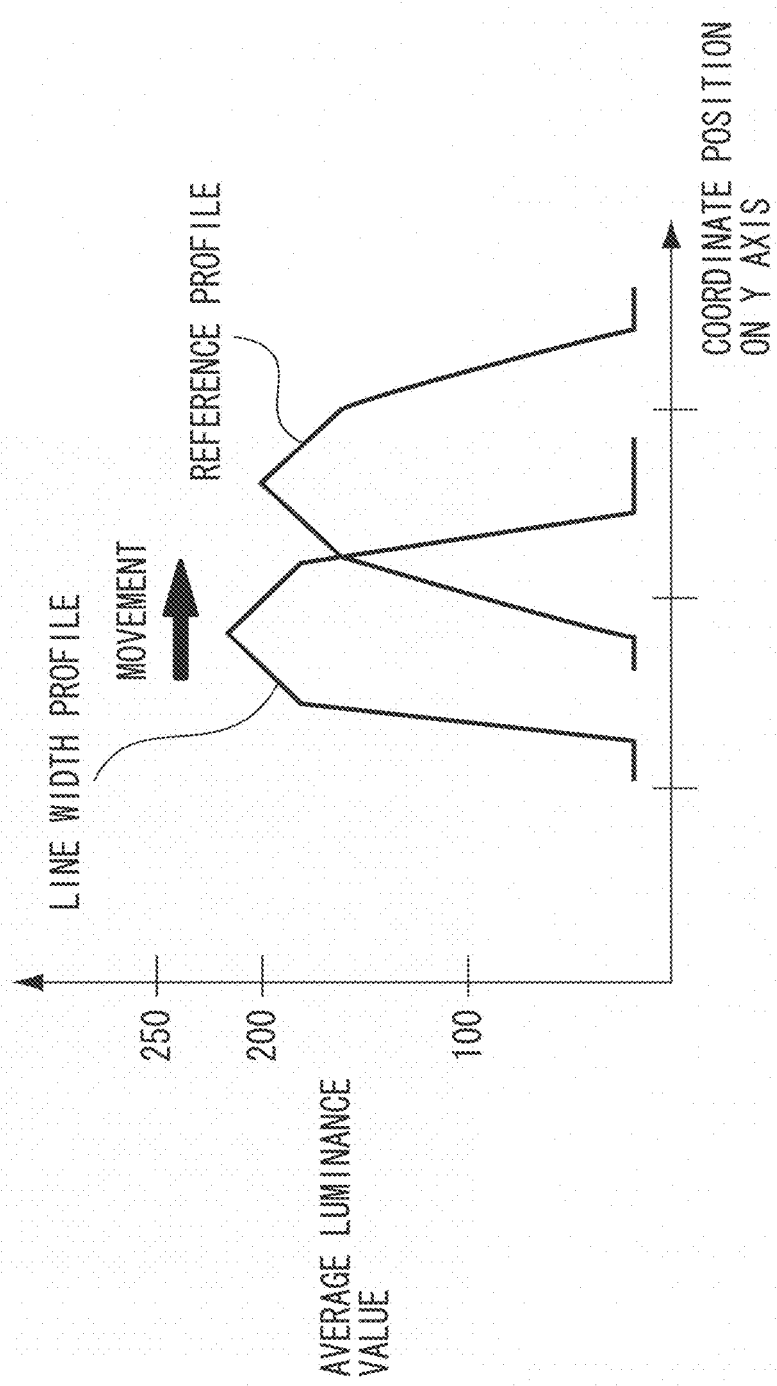

IMAGE PROCESSING APPARATUS, IMAGE PROCESSING METHOD, AND COMPUTER-READABLE STORAGE MEDIUM

BACKGROUND OF THE INVENTION

1. Field of the Invention

The present invention relates to an image processing apparatus configured to control line width correction of an image to be printed, an image processing method, and a computer program thereof. For example, the present invention relates to an image processing apparatus configured to correct a line width of a thin line or a character which is printed, using a correction parameter, an image processing method, and an image processing program thereof.

2. Description of the Related Art

In recent years, an electrophotographic technique has been highly developed. A copying machine has a mounted printer engine having a printing density of 1200 dots per inch (dpi) or greater to enable high-quality printing. Consequently, reproducibility of a thin line of an image or a character has been more important. However, the reproducibility of a thin line or a character may be changed depending on a use environment or long-term use of the copying machine.

Then, conventionally, a correction technique (calibration) has been proposed, which maintains the line width of a thin line or a character to be printed, in a constant condition and maintains reproducibility. A method for reading a document on which a thin line is printed, using a scanner, to acquire a first image, and thereafter reading a printed product on which the first image is printed, using the scanner, to acquire a second image is discussed in Japanese Patent Application Laid-Open No. 2010-113070. A method for comparing the first image with the second image, to calculate a correction amount of a line width so that a line width of the first image is equal to that of the second image is discussed in Japanese Patent Application Laid-Open No. 2010-113070. A method for subjecting image data to be printed, using the correction amount to dot adding (or dot thinning) processing, to control line width correction is discussed in Japanese Patent Application Laid-Open No. 2010-113070.

When the image is read using the scanner, blurring (edge blurring) occurs in an edge portion of the thin line on the read image data under the influence of a light condition and deviation of a focus. The degree of the edge blurring is different depending on the line width of the thin line. The method discussed in Japanese Patent Application Laid-Open No. 2010-113070 compares the two images (the first image and the second image) having thin lines having different line widths such as the document and the printed product obtained by copying and printing the document, and corrects images. The method discussed in Japanese Patent Application Laid-Open No. 2010-113070 corrects images without considering different degrees of edge blurring of the read images. More specifically, when the method corrects images so that the line widths of both the images are equal to each other using the two read images in which the degrees of edge blurring are different and correct line widths are not known, it becomes difficult to precisely correct the line width.

SUMMARY OF THE INVENTION

The present invention is directed to an image processing apparatus configured to perform line width correction in consideration of edge blurring in line width correction using a scanner.

According to an aspect of the present invention, an image processing apparatus configured to determine a correction parameter used for line width correction from among a plurality of candidate parameters includes an output unit configured to output a line width chart obtained by printing a plurality of straight lines subjected to line width correction using the plurality of candidate parameters as line width patches, a reading unit configured to read the line width chart output by the output unit to acquire respective images of the line width patches, an acquisition unit configured to acquire pixel values of pixels in the images of the line width patches acquired by the reading unit, a generation unit configured to generate, for each of the line width patches, a line width profile representing a distribution of the pixel values acquired by the acquisition unit, a storing unit configured to store a reference profile representing a distribution corresponding to a predetermined line width, and a determination unit configured to determine the correction parameter from among the plurality of candidate parameters based on a comparison between the distribution represented by each line width profile generated by the generation unit and the distribution represented by the reference profile stored in the storing unit.

Exemplary embodiments of the present invention can perform line width correction in consideration of edge blurring to enhance reproducibility of images to be printed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is an exemplary processing flow chart according to the first exemplary embodiment.

FIGS. 7A and 7B illustrate a processing procedure by a profile generation unit.

FIG. 8 illustrates an example of skew detection by the profile generation unit.

FIG. 12 is an exemplary processing flow chart according to a second exemplary embodiment of the present invention.

FIG. 17 illustrates a printing environment setting item in paper type specification.

FIG. 19 illustrates an example of profile alignment processing by convolution sum.

DESCRIPTION OF THE EMBODIMENTS

Various exemplary embodiments, features, and aspects of the invention will be described in detail below with reference to the drawings.

Figure 1:
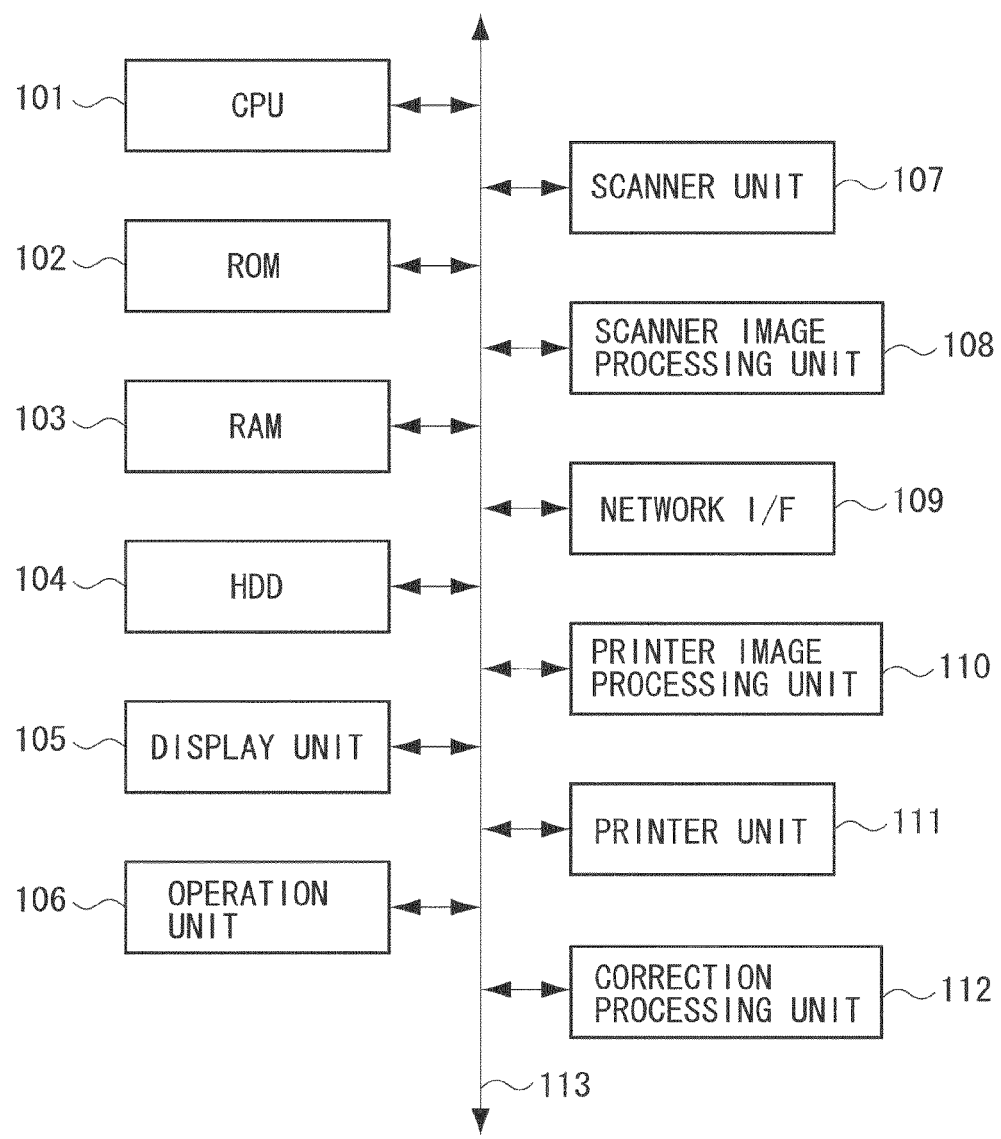
FIG. 1 is a block diagram illustrating an example of a hardware configuration of an image processing apparatus according to a first exemplary embodiment of the present invention.

FIG. 1 is a block diagram illustrating an example of a hardware configuration of an image processing apparatus according to a first exemplary embodiment of the present invention. Examples of an apparatus to which the present exemplary embodiment is applied include an electrophotography type color or monochrome image processing apparatus, such as a digital copying machine, a laser printer separately provided with a scanner, and a facsimile. The image processing apparatus of the present exemplary embodiment includes a central processing unit (CPU) 101, a read-only memory (ROM) 102, a random access memory (RAM) 103, a hard disk drive (HDD) 104, a display unit 105, an operation unit 106, a scanner unit 107 (reading unit), a scanner image processing unit 108, a network interface (I/F) 109, a printer image processing unit 110, a printer unit 111 (output unit), a correction processing unit 112, and a system bus 113.

The above-mentioned configuration will be described in detail. The CPU 101 is a central processing unit performing control of the whole apparatus and arithmetic processing. The CPU 101 executes image processing to be described below, based on a program stored in the ROM 102. The ROM 102 is a read-only memory. The ROM 102 is a storage area for a system start program, a program configured to control the scanner unit 107 and the printer unit 111, character data, and character code information. The RAM 103 is a random access memory. The RAM 103 is used when the program and data stored in the ROM 102 for each of various types of processing are loaded and executed by the CPU 101. The RAM 103 is used as a data storage area of an image file received via the scanner unit 107 or the network I/F 109. The HDD 104 includes a hard disk, for example. The HDD 104 is used to store results of processing executed by the CPU 101, the program, each information file, and a print image. The HDD 104 is also used as a work area when the CPU 101 executes processing. The display unit 105 displays a screen using a liquid crystal display, for example. The display unit 105 is used for displaying a setting state of the apparatus, processing for the units of the apparatus such as the CPU 101, and an error condition. The operation unit 106 inputs various commands such as a user's setting change and reset. The RAM 103 stores information on the various commands input via the operation unit 106. The information is used when the CPU 101 executes the processing. The scanner unit 107 irradiates a document with light, and converts the reflected light into an electric signal using a charge-coupled device (CCD) sensor including RGB (red, green, blue) color filters, to obtain RGB image data corresponding to the document via a parallel (or serial) cable. The scanner unit 107 transmits the RGB image data to the scanner image processing unit 108. The scanner image processing unit 108 subjects the image data read by the scanner unit 107 to image processing such as shading processing. The network I/F 109 connects the apparatus to a network such as an intranet via the network I/F 109. Data such as page description language (PDL) data is input to the image processing apparatus from a PC via the network (not illustrated) via the network I/F 109. The printer image processing unit 110 subjects the image data subjected to image processing by the scanner image processing unit 108 or the PDL data received via the network I/F 109 to image processing suitable for a printer such as conversion processing to CMYK (cyan, magenta, yellow, black) image data of the RGB the image data. The printer unit 111 forms an image of the CMYK image data processed by the printer image processing unit 110 on a sheet (paper or an OHP (overhead projector) sheet) according to electronic photograph processing of exposure, latent image, development, transfer, and fixing. The correction processing unit 112 performs correction processing (calibration) for maintaining a line width of a thin line or a character in a fixed state. This result of the calibration is used in the printer image processing unit 110. The system bus 113 connects the above-mentioned constituent units, and serves as a data channel therebetween.

Figure 2:
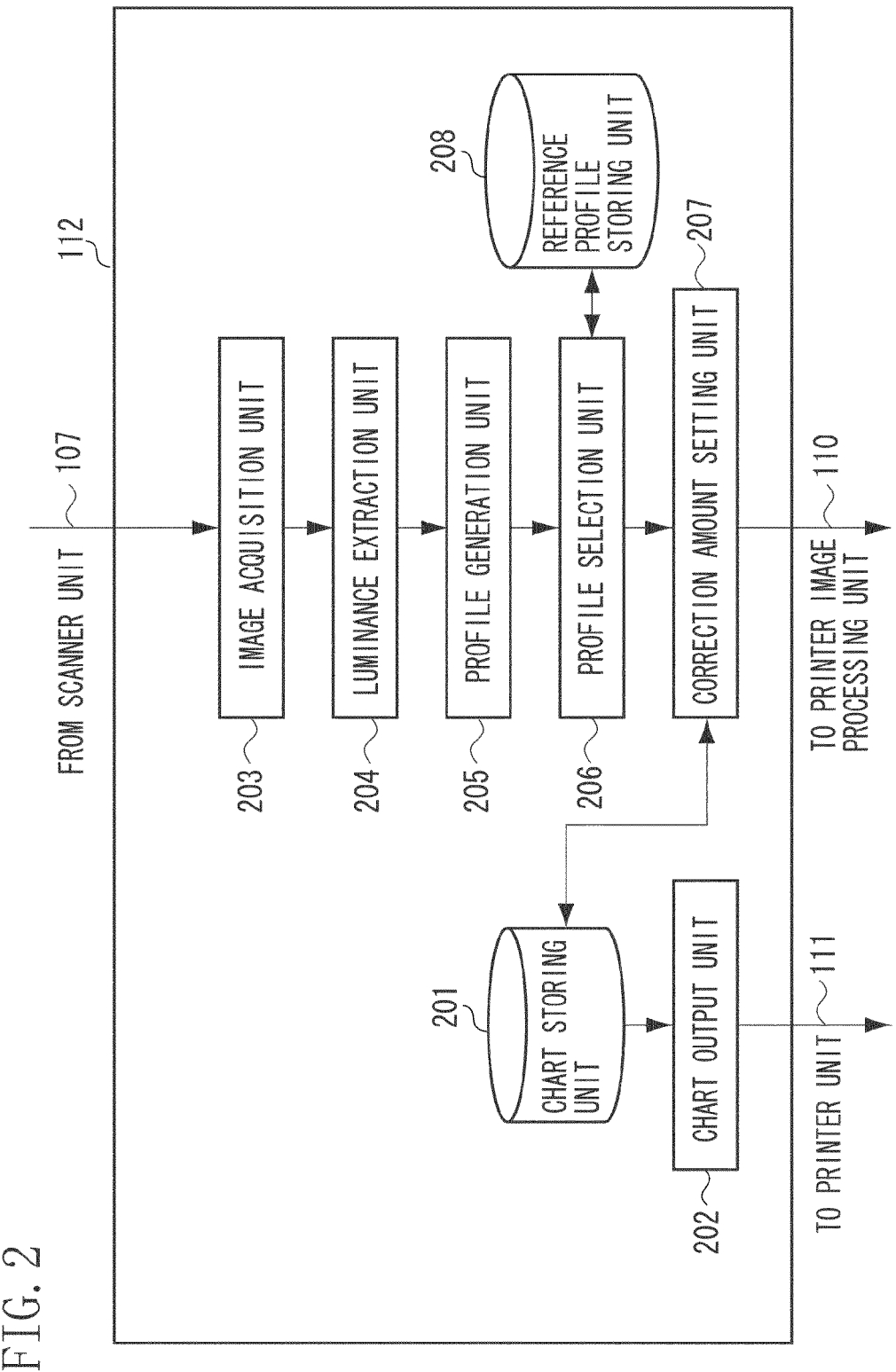
FIG. 2 is a block diagram illustrating a configuration of a correction processing unit.

FIG. 2 is a block diagram illustrating a configuration of the correction processing unit 112 according to the present exemplary embodiment. The correction processing unit 112 of the present exemplary embodiment includes a chart storing unit 201, a chart output unit 202, an image acquisition unit 203, a luminance extraction unit 204, a profile generation unit 205, a profile selection unit 206, a correction amount setting unit 207, and a reference profile storing unit 208.

Figure 6A:
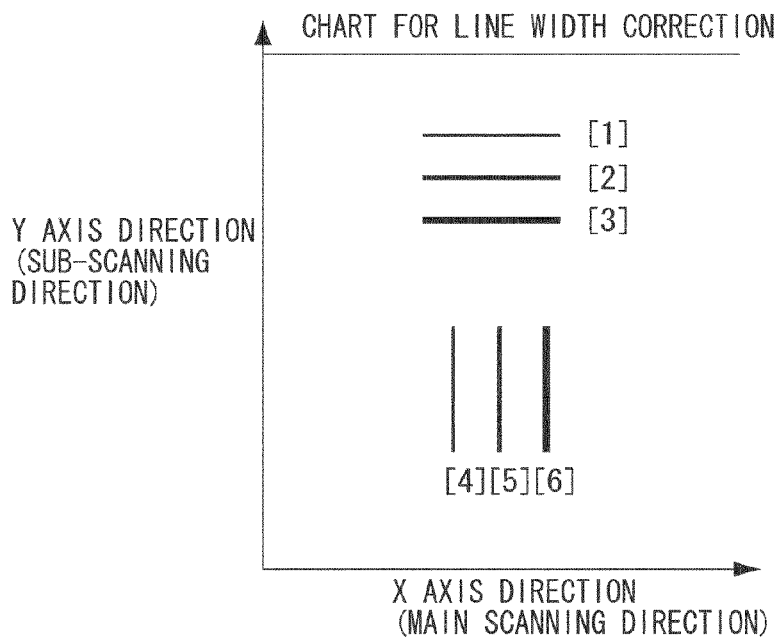
FIGS. 6A and 6B illustrate an example of a chart for line width correction and each of line width patches.

The above-mentioned configuration will be described in detail. The chart storing unit 201 stores a plurality of parameters (candidate parameters) (described below) for generating line width patches ([1] to [6] in FIG. 6A) of a chart for line width correction (line width chart) (FIG. 6A). The chart output unit 202 outputs image data of the chart for line width correction (FIG. 6A) including the line width patches ([1] to [6] in FIG. 6A) subjected to line width correction processing using the plurality of candidate parameters stored in the chart storing unit 201, to the printer unit 111. The image acquisition unit 203 reads the chart for line width correction printed by the printer unit using the scanner unit 107, and acquires the RGB image data of the line width chart including the line width patches. The luminance extraction unit (acquisition unit) 204 extracts and acquires luminance data from the RGB image data of the line width chart acquired by the image acquisition unit 203. The profile generation unit (generation unit) 205 generates profiles (line width profiles) of luminance corresponding to the images of the line width patches on the chart for line width correction (FIG. 6A) from a distribution of the luminance data extracted by the luminance extraction unit 204. In this case, the profile generation unit 205 simultaneously detects whether the chart for line width correction is skewed. The profile selection unit (determination unit) 206 reads a reference profile from the reference profile storing unit 208 previously storing the reference profile, and compares the reference profile with the profiles generated by the profile generation unit 205. The profile selection unit 206 selects a line width profile closest to the reference profile. The correction amount setting unit (determination unit) 207 reads the candidate parameter corresponding to the line width profile selected by the profile selection unit 206 from the chart storing unit 201, and sets the candidate parameter as a correction value (correction parameter) in a correction value storage unit 406 in the printer image processing unit 110 to be described below.

Figure 3:
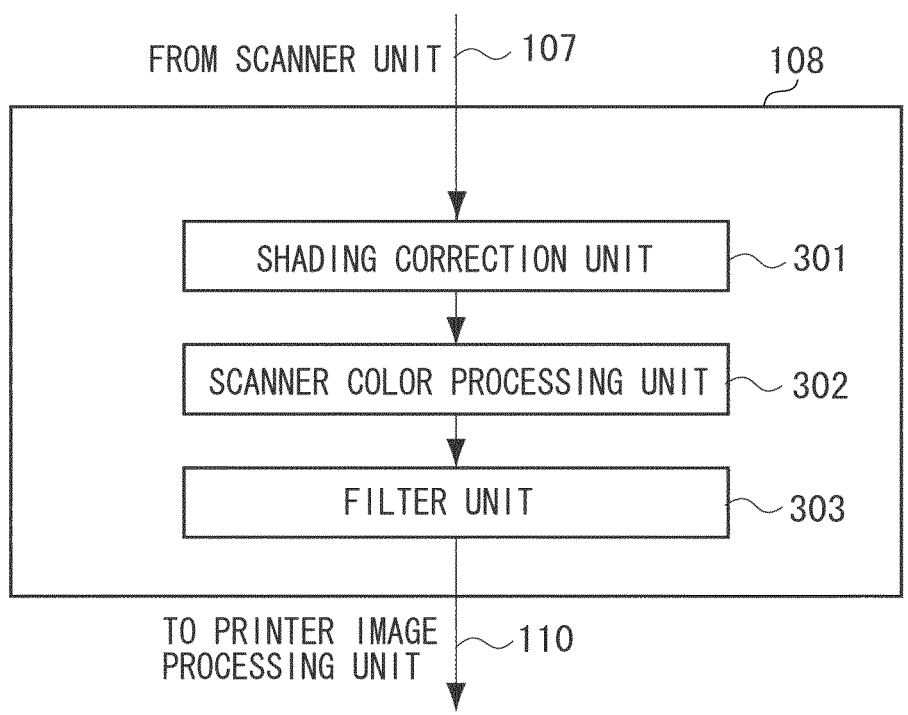
FIG. 3 is a block diagram illustrating a configuration of a scanner image processing unit.

FIG. 3 is a block diagram illustrating a configuration of the scanner image processing unit 108 according to the present exemplary embodiment. The scanner image processing unit 108 of the exemplary embodiment includes a shading correction unit 301, a scanner color processing unit 302, and a filter unit 303.

The above-mentioned configuration will be described in detail. The shading correction unit 301 subjects the RGB image data input from the scanner unit 107 to shading correction, to flatly correct unevenness in a main scanning direction of a read signal value of the RGB image data. The scanner color processing unit 302 receives the RGB image data corrected by the shading correction unit, and converts the RGB image data peculiar to the scanner into RGB image data of a standard color space (for example, a colorimetric color space such as sRGB). The filter unit 303 receives the RGB image data of the standard color space converted by the scanner color processing unit 302, and subjects the RGB image data to filter processing for correcting a spatial frequency characteristic of an image signal. The filter unit 303 transmits the image data subjected to the filter processing to the printer image processing unit 110.

Figure 4:
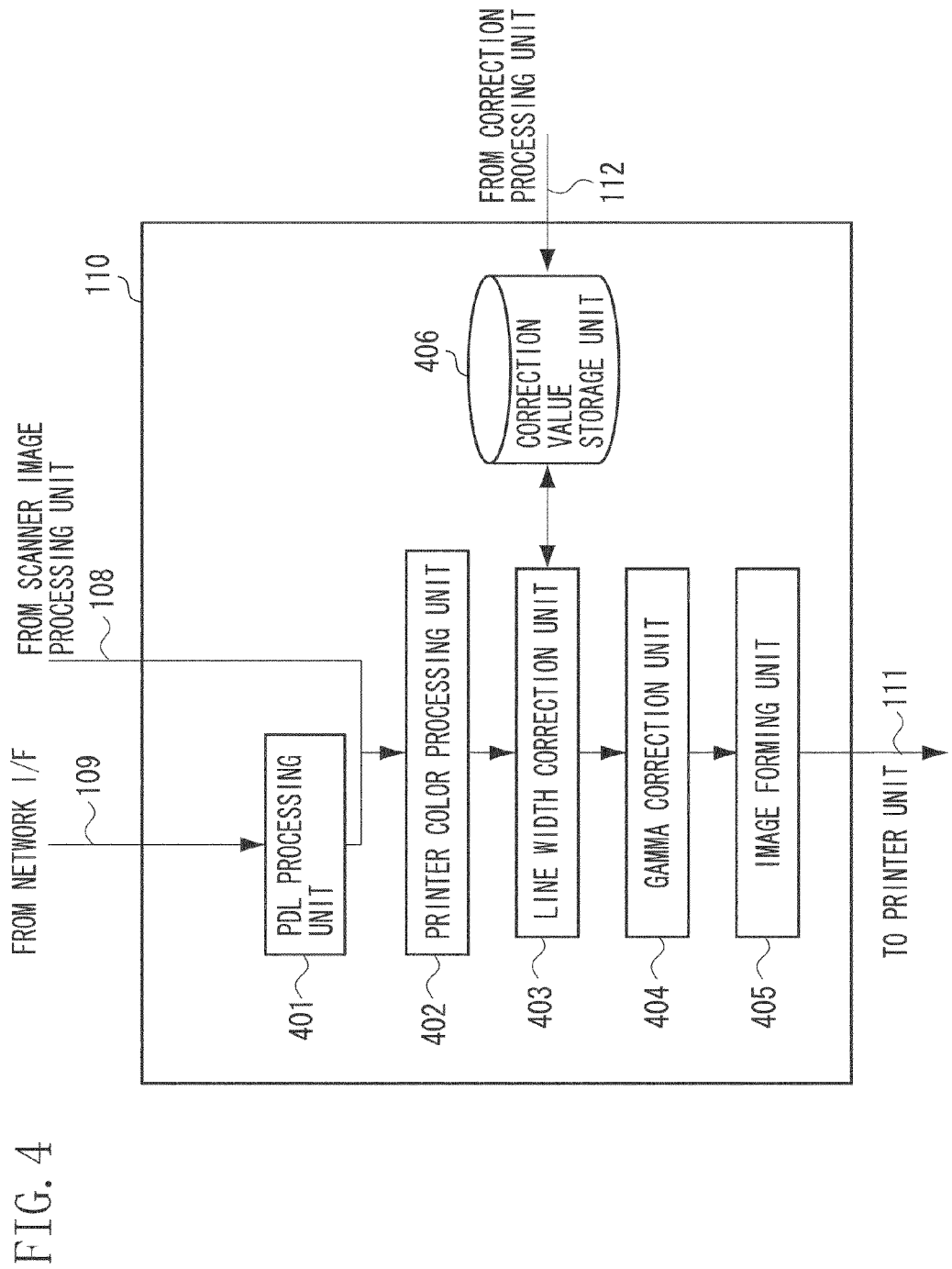
FIG. 4 is a block diagram illustrating a configuration of a printer image processing unit.

FIG. 4 is a block diagram illustrating a configuration of the printer image processing unit 110 in the first exemplary embodiment of the present exemplary embodiment. The printer image processing unit 110 of the present exemplary embodiment includes a PDL processing unit 401, a printer color processing unit 402, a line width correction unit 403, a gamma correction unit 404, an image forming unit 405, and the correction value storage unit 406.

The above-mentioned configuration will be described in detail. The PDL processing unit 401 performs interpretation (image region segmentation) of PDL data received via the network I/F 109, color conversion to the standard color space by a color management system (CMS), and rasterization. The printer color processing unit 402 subjects the RGB image data of the standard color space input from the PDL processing unit 401 or the scanner image processing unit 108 to color conversion processing for generating the CMYK image data suitable for the printer. The line width correction unit 403 performs thickening processing for adding a dot (or thinning processing for thinning a dot) to a character and a line drawing in multiple-valued CMYK image data input from the printer color processing unit 402 based on the correction parameter stored in the correction value storage unit 406, to perform line width correction. The gamma correction unit 404 subjects the CMYK image data corrected by the line width correction unit 403 to correction processing for stabilizing a gradation characteristic of the printer unit 111. The image forming unit 405 converts the CMYK image data corrected by the gamma correction unit 404 into a halftone image of N (integer) bits suitable for the printer, and sends the halftone image to the printer unit 111.

FIG. 5 is an exemplary processing flow of the first exemplary embodiment executed by the correction processing unit 112. The processing is executed in response to a user's instruction input via the operation unit 106, for example, as a trigger. More specifically, when instruction information of the line width correction via the operation unit 106, for example, is input to the CPU 101, the CPU 101 loads and executes a program for starting line width correction processing of FIG. 5 from the ROM 102, thereby realizing processing of the flow chart of FIG. 5. Hereinafter, an example in which correction processing of the thin line of "black, 2 dot lines, 100% density" is executed in both a main scanning and sub-scanning directions will be described. When the same operation for other colors (cyan, magenta, yellow) is performed, correction processing for each color plate can be performed. Correction processing can be performed by performing the same operation for a 1 dot line or 3 dot lines or greater, middle density (density of less than 100%), and an oblique line.

Figure 6B:
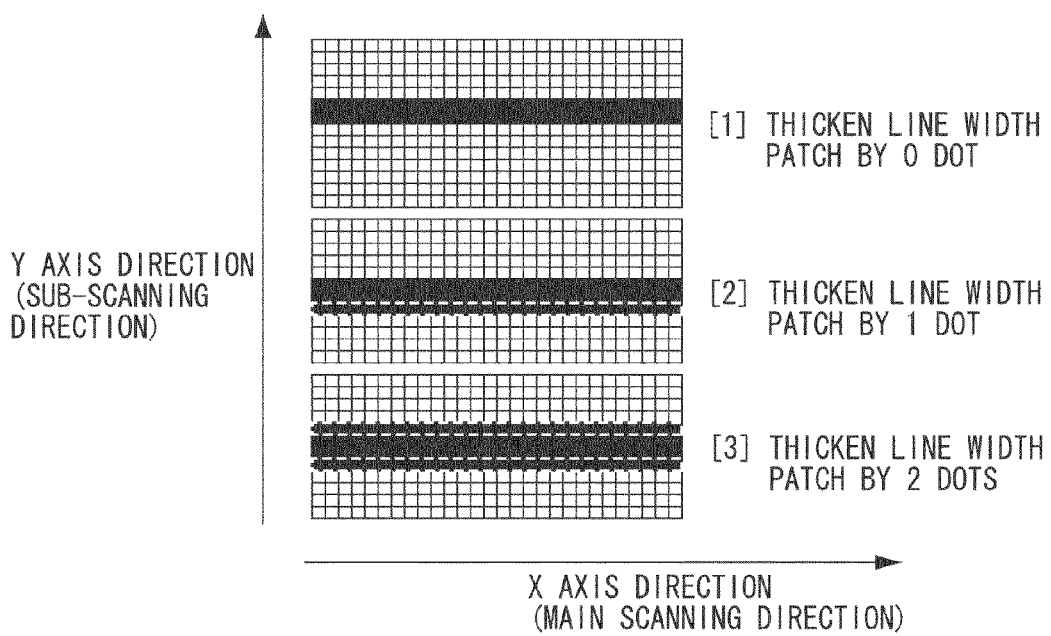

In step S111, the chart output unit 202 outputs the image data of the chart for line width correction illustrated in, for example, FIG. 6A to the printer unit 111 based on the parameters (candidate parameters) stored in the chart storing unit 201. FIG. 6B expands the line width patches [1] to [3] of the chart for line width correction (FIG. 6A). The line width patch [1] is obtained by outputting a thin line of 2 dot lines (predetermined line width) to be corrected, without line width correction. The line width patch [2] is obtained by adding a 1 dot line having density of 100% downward in the sub-scanning direction of the line width patch [1]. The line width patch [3] is obtained by adding 2 dot lines having density of 100% upward and downward, respectively, in the sub-scanning direction of the line width patch [1]. Thus, the chart for line width correction includes line width patches obtained by subjecting the line width (in the example, 2 dot lines) to be corrected, to gradual thickening processing (line width correction). Although the line width patch [2] is obtained by adding the 1 dot line downward, the 1 dot line may be added upward in consideration of toner scatters of the thin line. Examples of adjustment items of the correction parameter include a color (a correction color of a line width), a direction (a correction direction of a line width), a line width (a correction amount of a line width), and density (correction density of a line width). When the line width patch [2] in FIG. 6B is taken as an example, the correction parameter is "black, downward, 1 dot, 100%".

In step S112, the display unit 105 instructs the user to put the chart for line width correction output from the printer unit 111 in step S111 on a platen of the scanner unit 107, and prompts the user to perform a reading operation. The image acquisition unit 203 acquires the RGB image data read by the scanner unit 107. Pixel values of pixels of the read RGB image data are acquired by specifying coordinate values (X axis coordinate, Y axis coordinate) of the pixels of the RGB image data. In the present exemplary embodiment, the X axis coordinate and the Y axis coordinate are specified with a lower left of the line width chart set as an origin, as illustrated in FIG. 6A.

In step S113, the luminance extraction unit 204 extracts the luminance data from the RGB image data read in step S112 (FIG. 7A). Examples of an extraction method include a method for subjecting the RGB image data to be input, to color space conversion, using a matrix arithmetical operation to a CIE1976L*a*b* uniform color space from an RGB color coordinate system, and using an L* component. The examples further include a method for using green luminance data when obtaining luminance data of a thin line of black (green has less deviation in spectral reflectivity than that of red or blue, and provides a density change in black, which is a comparatively and easily read). As other colors, red luminance data may be acquired for a thin line of cyan; green luminance data may be acquired for a thin line of magenta; and blue luminance data may be acquired for a thin line of yellow.

In step S114, the profile generation unit 205 scans the line width patches [1], [2], and [3] in FIG. 6B from the luminance data extracted by the luminance extraction unit 204 along the X axis direction (the main scanning direction, an extension direction of the straight line of the line width patch), to obtain the summation of luminance values of the pixels. More specifically, the profile generation unit 205 obtains the summation of the luminance values of the pixels of the pixel columns parallel to the extension direction (the X axis direction) of the straight lines belonging to the images of the line width patches and printed as the line width patches. The profile generation unit 205 divides the summation of the luminance values by the number of the pixels, to calculate the average luminance value (average pixel value) corresponding to the position in the Y axis direction of the scanned pixel columns (the sub-scanning direction, a direction perpendicular to the extension direction of the line) (FIG. 7A). The processing is repeatedly executed in the Y axis direction. More specifically, the profile generation unit 205 obtains the average luminance value for each of the plurality of pixel columns parallel to the X axis direction. Similarly, the profile generation unit 205 scans the line width patches [4], [5], and [6] in FIG. 6B along the Y axis direction (the sub-scanning direction, the extension direction of the straight line of the line width patch), to obtain the summation of the luminance value S of the pixels. The profile generation unit 205 divides summation of the luminance values by the number of pixels, to calculate the average luminance value (average pixel value) corresponding to the position in the X axis direction of the scanned pixel columns (the main scanning direction, a direction perpendicular to the extension direction of the line). The processing is repeatedly executed in the X axis direction.

In step S115, the profile generation unit 205 checks whether the chart for line width correction is skewed. In the present exemplary embodiment, a method for detecting the skew is not particularly limited. When the line width chart is skewed, a pixel having a great (bright) luminance value and a pixel having a small (dark) pixel are generated as illustrated in FIG. 8, which increases a dispersion of the luminance values in the X axis direction. Therefore, as the method for detecting the skew, for example, the profile generation unit 205 obtains a dispersion value (a skew amount) in the X axis direction of the luminance values, and determines whether the dispersion value is greater than a threshold value. When the dispersion value is equal to or greater than the threshold value, the profile generation unit 205 instructs the display unit 105 to display a message (reread message) prompting the user to adjust a placement position of the chart for line width correction, and requests the user to reread the line width chart. The profile generation unit 205 executes the processing from step S112 again. When the dispersion value obtained by the profile generation unit 205 is less than the threshold value, the processing proceeds to step S116.

In step S116, the profile generation unit 205 executes the following processing. The average luminance values obtained in step S114 are plotted for coordinates on the Y axis for the line width patches [1], [2], and [3] illustrated in FIG. 6B, thereby generating the profiles (FIG. 7B). These generated profiles respectively correspond to the line width patches, and the average luminance value (average pixel value) for each of the coordinates included in each of the profiles is an index value indirectly representing the line width of the straight line of the line width patch corresponding to each of the profiles.

Similarly, the average luminance values obtained in step S114 are plotted for the coordinates on the X axis for the line width patches [4], [5], and [6] illustrated in FIG. 6B, thereby generating profiles. The generated plurality of profiles is referred to as line width profiles.

In step S117, the profile selection unit 206 calls up a profile (a reference profile corresponding to a predetermined line width) having a thin line to be corrected (herein, a thin line having a line width of 2 dot lines) and having a predetermined line width. The profile is stored in the reference profile storing unit 208. The reference profile is generated as follows, for example. After the scanner unit 107 and the printer unit 111 are first confirmed to be in an ideal device state when the image processing apparatus is designed, the line width patches (for example, corresponding to the line width patch [1] and the line width patch [4] in FIG. 6A) subjected to no thickening processing are output. The same processing as that of steps S112 to S116 are performed, thereby generating a profile. The reference profile storing unit 208 stores the generated profile as the reference profile. The ideal device state herein means a device state before the characteristics of the device are changed according to long-term use. In other words, the ideal device state means a device state of the printer unit 111 in which a line width of a straight line on a sheet is a predetermined line width when image data of the straight line representing the predetermined line width is printed on a sheet. The ideal device state means a state of the scanner unit 107 in which a degree of blurring of the image obtained by reading is small when the straight line on the sheet is read.

In step S118, the profile selection unit 206 performs processing for making a luminance width of the line width profile coincident with a luminance width of the reference profile (contrast correction processing). This contrast correction processing is performed when a range (Lmax, Lmin) of the luminance values of the line width profiles corresponding to the line width patches generated instep S116 is distributed in only a part of a range (Smax, Smin) of a luminance value of the reference profile. When the luminance value of the given line width profile is set to L and the luminance value of the line width profile subjected to the contrast correction processing is performed is set to S, the luminance value S is calculated according to the following formula.

$$S=(Smax-Smin)\cdot(L-Lmin)/(Lmax-Lmin)+Smin$$

This contrast correction processing sharpens the line width profiles corresponding to the line width patches, to correct a contrast of the line width profile subjected to the contrast correction processing so that the contrast of the line width profile coincides with a contrast of the reference profile.

In step S119, the profile selection unit 206 aligns centers of the plurality of line width profiles subjected to the contrast correction processing in S118 and of the reference profile. The profile selection unit 206 aligns centers of the coordinate positions on the Y axis for the line width profiles corresponding to the line width patches [1], [2], and [3]. The profile selection unit 206 aligns centers of the coordinate positions on the X axis for the line width patches [4], [5], and [6]. As a specific method, general methods such as convolutional sum can be used. For example, alignment of the center of the line width profile corresponding to the line width patch [1] will be described. As illustrated in FIG. 19, the profile selection unit 206 performs an arithmetical operation for adding the product of the average luminance values of the line width profile and the reference profile in each of the coordinate positions through the coordinate position on the Y axis while moving the line width profile in the Y axis direction of the reference profile. The profile selection unit 206 finds a moving destination in the Y axis direction of the line width profile providing the maximum arithmetical operation result, thereby aligning the centers thereof.

Figure 9:
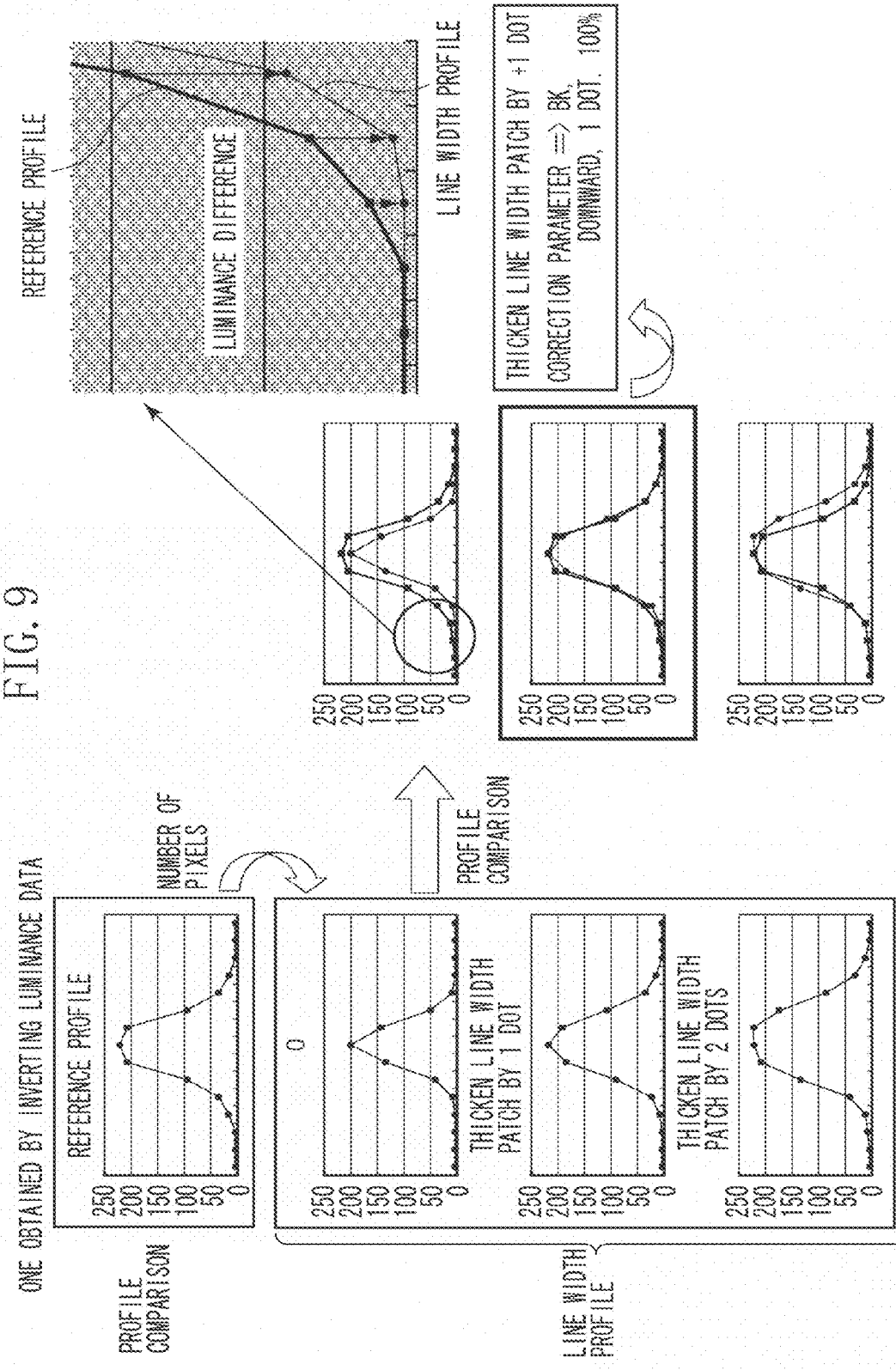
FIG. 9 illustrates selection of line width profiles by a profile selection unit.
Figures 10A, 10B:
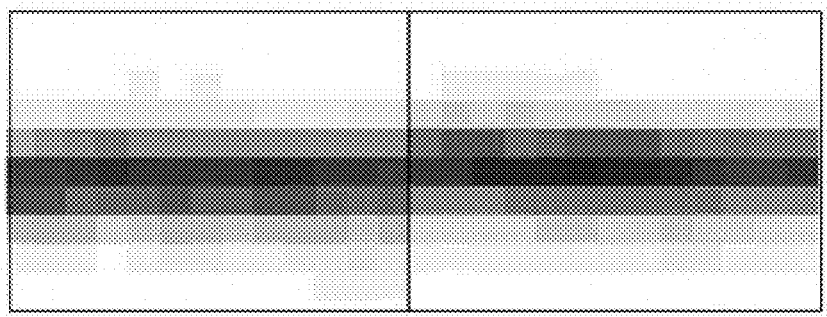
FIGS. 10A and 10B illustrate an example for describing a difference in shapes of profiles by a read phase difference.

In step S120, the profile selection unit 206 compares the line width profile corresponding to the line width patch with the reference profile as illustrated in FIG. 9, using the line width profile aligned in step S119. Specifically, the profile selection unit 206 calculates a difference (luminance difference) between the luminance values of the reference profile and the line width profile for each of the coordinate positions on the Y axis, and calculates the cumulative difference (cumulative luminance difference), which is the summation of the luminance differences for each of the line width profiles corresponding to the line width patches. The luminance difference can take a positive or negative value. The profile selection unit 206 selects the line width profile having the minimum absolute value of the calculated cumulative luminance difference. The luminance difference includes positive and negative values, and thereby, even when the shape of the line width profile has a minute error, the error can be absorbed. As illustrated in FIG. 10A, when an image signal acquired from the scanner unit 107 is sampled from analog data to digital data, a read phase difference is generated. In this case, the luminance values of the pixels are changed depending on sampling under the influence of the read phase difference during sampling in spite of the same line width in the analog data (FIG. 10B). As a result, the shapes of the line width profiles are different depending on sampling. However, the profile selection unit 206 can calculate the cumulative luminance difference using the positive and negative luminance differences to absorb the influence of the read phase difference, and perform profile comparison.

In step S121, the correction amount setting unit 207 calls up a parameter (candidate parameter) corresponding to the line width profile selected in step S120 from the chart storing unit 201, and sets the parameter in a register of the correction value storage unit 406 included in the printer image processing unit 110. The parameter set in the register becomes the correction parameter.

A configuration may cooperate with other correction function (for example, gradation correction processing for correcting the gradation characteristic of the printer unit 111), simultaneously output the chart for line width correction illustrated in FIG. 6A when executing the other correction function, and execute the processing of steps S111 to S121.

The profile generation unit 205 checks whether the chart for line width correction is skewed in step S115. However, when the profile generation unit 205 determines that the chart for line width correction is skewed, skew correction may be automatically performed using a known skew correction method without notifying adjustment of a placement position to the user.

In the present exemplary embodiment, the correction parameter thus set is used when executing a print function to be described below.

Figure 11A:
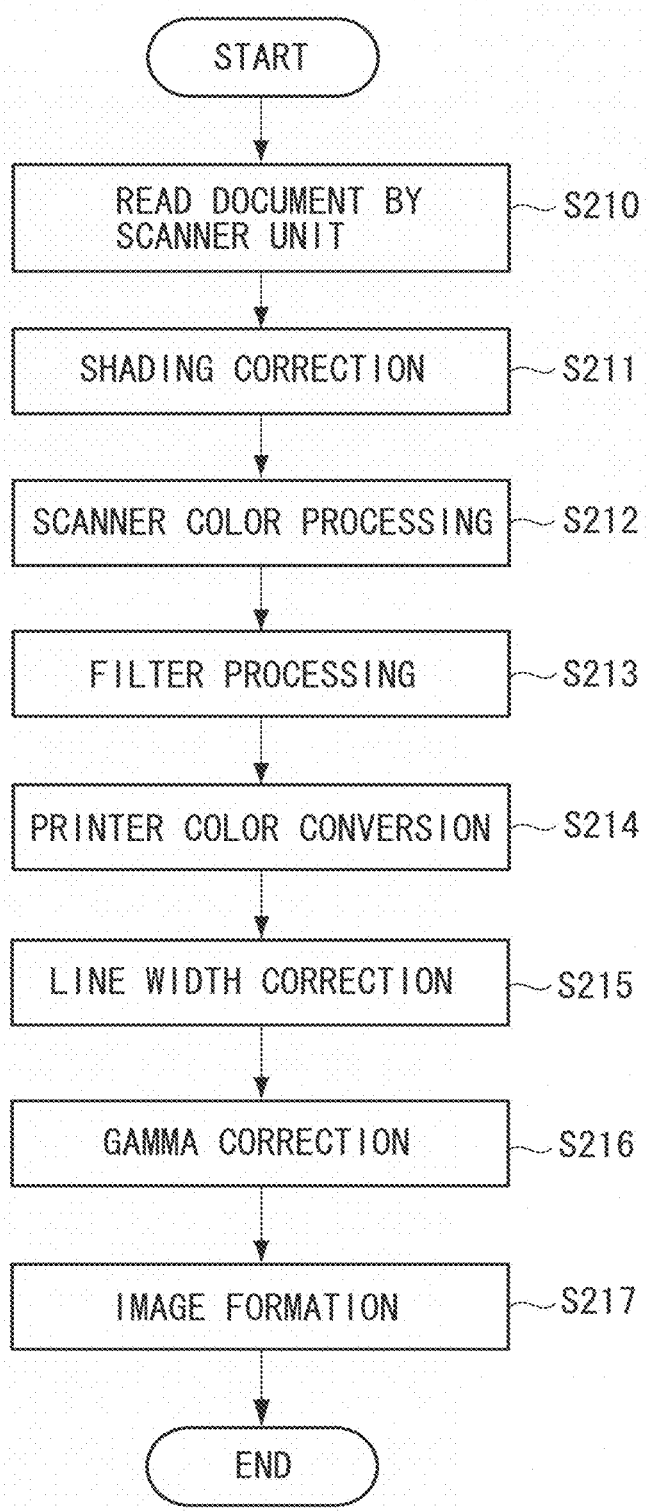
FIGS. 11A and 11B illustrate an image processing flow in a copy function and a print function.

FIG. 11A is an exemplary processing flow chart when executing a copy function using the scanner unit 107, the scanner image processing unit 108, the printer image processing unit 110, and the printer unit 111 in the first exemplary embodiment. This processing flow is executed when the CPU 101 acquires an instruction of scan copy via the operation unit 106. The CPU 101 loads a program for executing the processing flow of FIG. 11A to the RAM 103 from the ROM 102, and executes the program to realize the processing flow.

In step S210, the scanner unit 107 irradiates a document with light, and converts the reflected light into an electric signal using a CCD device including RGB color filters, to obtain RGB image data (image to be subjected to line width correction) corresponding to the document via a parallel (or serial) cable.

In step S211, the shading correction unit 301 subjects the RGB image data read by the scanner unit 107 to shading correction to flatly correct unevenness in the main scanning direction.

In step S212, first, the scanner color processing unit 302 converts the RGB image data subjected to the shading correction in step S211 into RGB image data of a standard color space (for example, a colorimetric color space such as sRGB) via a CIE1976L*a*b* uniform color space from a color space of an RGB color coordinate system peculiar to a scanner. For this processing, the scanner color processing unit 302 uses a three-dimensional look-up table (LUT) for color gamut mapping for converting into coordinates of a CIE1976 L*u*v* uniform color space, a CIE1976 L*a*b* uniform color space, and an XYZ color space. Since the three-dimensional LUT includes N×N×N grid points, the scanner color processing unit 302 can perform color conversion with sufficient accuracy in principle if grid spacing is sufficiently made narrow. However, since in fact, a point subjected to color conversion only rarely corresponds to the grid point from problems such as a memory capacity and a processing speed, the scanner color processing unit 302 obtains standard color space RGB data according to three-dimensional interpolation processing.

In step S213, the filter unit 303 subjects the RGB image data to the filter processing for correcting the spatial frequency characteristic of the RGB image data, and sends the RGB image data subjected to the filter processing, to the printer image processing unit 110.

In step S214, the printer color processing unit 402 executes the color conversion processing for generating the CMYK image data suitable for the printer from the RGB image data of the standard color space converted in step S213. On this occasion, the printer color processing unit 402 converts the RGB image data of the standard color space into the CIE1976 L*a*b* uniform color space from the RGB color coordinate system. The printer color processing unit 402 then performs an LUT arithmetical operation of three-dimensional input and four-dimensional output in order to define the color conversion to a CMYK color coordinate system, and outputs the CMYK image data. The printer color processing unit 402 transmits the CMYK image data to the line width correction unit 403.

In step S215, the line width correction unit 403 transmits the CMYK image data received from the printer color processing unit 402 to the gamma correction unit 404 without executing the line width correction when the scan copy is instructed.

In step S216, the gamma correction unit 404 subjects the CMYK image data received from the line width correction unit 403 in step 215 to one-dimensional LUT processing for each CMYK, in order to correct a change in a printer density characteristic caused by environmental changes due to a temperature and humidity, or endurance, thereby performing gradation correction. The gamma correction unit 404 transmits the CMYK image data subjected to the gradation correction to the image forming unit 405.

In step S217, the image forming unit 405 converts the CMYK image data subjected to the gradation correction in step S216 into the halftone image of N (integer) bits suitable for the printer, and sends the halftone image to the printer unit 111. The printer unit 111 receiving the halftone image executes image formation.

Figure 11B:
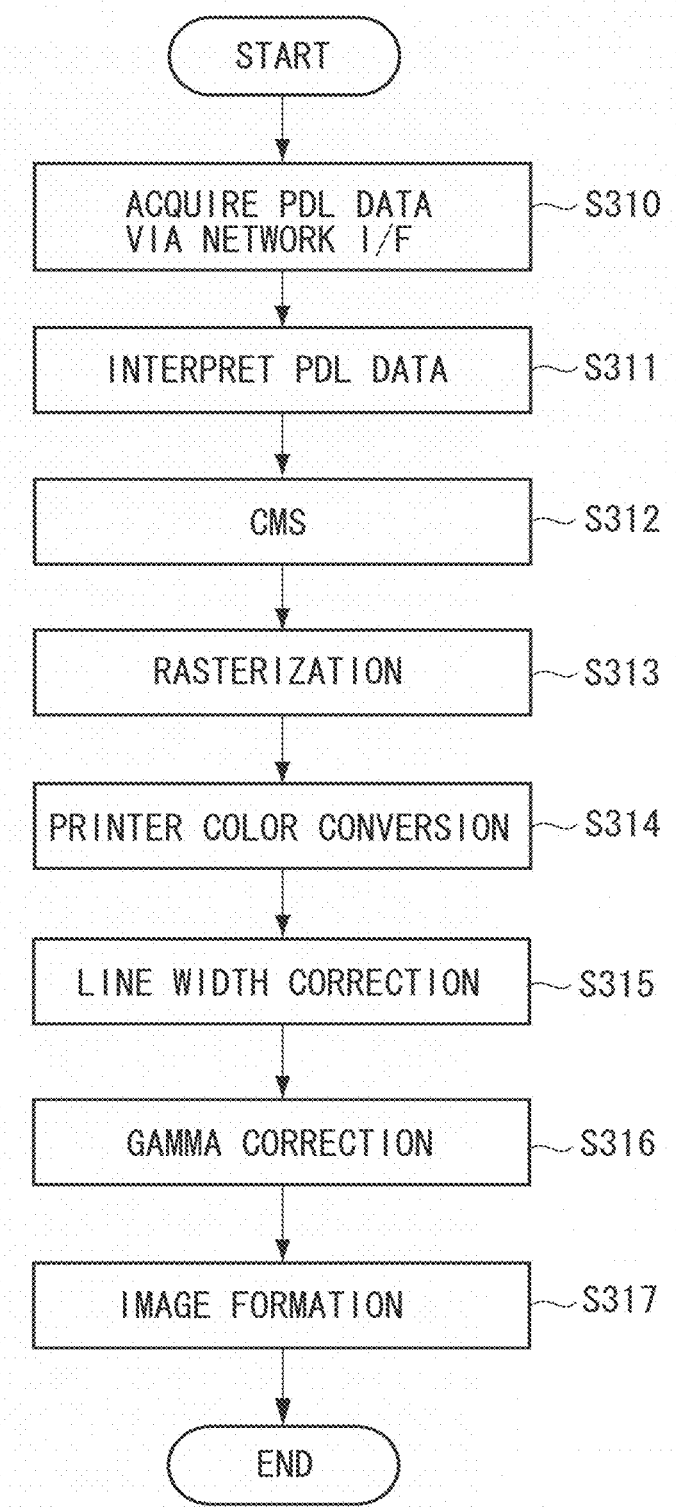

FIG. 11B is an exemplary processing flow chart when executing a print function using the printer image processing unit 110 and the printer unit 111 in the first exemplary embodiment. This processing flow is executed when the CPU 101 acquires an instruction of printing via the network I/F 109. The CPU 101 loads a program for executing the processing flow of FIG. 11B to the RAM 103 from the ROM 102, and executes the program to realize the processing flow.

In step S310, the network I/F 109 receives the PDL data sent from a host PC on the network, and sends the PDL data to the PDL processing unit 401.

In step S311, the PDL processing unit 401 interprets the PDL data received via the network I/F 109. When each data included in the received PDL data (the image subjected to the line width correction) is subjected to image region segmentation for attributes such as a character (thin line), a graphic, and a photograph in this interpretation of the PDL data, the PDL processing unit 401 subjects only the character (thin line) to the line width correction performed in step S315. For example, the PDL processing unit 401 may add line width correction information to only data having the character attribute of the PDL data in step S311. The line width correction unit 403 may subject line width correction to only data to which the line width correction information is added in step 315.

In step S312, the PDL processing unit 401 subjects the RGB image data of the standard color space (mainly, sRGB) of original PDL data to CMS processing. The CMS processing color-reconverts the RGB image data into the RGB image data of the standard color space via the CIE1976 L*a*b* uniform color space from the RGB color coordinate system. The CMS processing is generally executed by using the profile based on regulation of ICC (International Color Consortium). A plurality of ICC profiles is prepared, and thereby it is possible to perform color gamut matching according to applications (attributes) of image data.

In step S313, the PDL processing unit 401 subjects the image data (the RGB image data of the standard color space) subjected to the CMS processing in step S312 to rasterization processing, to generate bitmap image data.

In step S314, the printer color processing unit 402 executes the color conversion processing for generating the CMYK image data suitable for the printer from the bitmap image data generated in step S313. On this occasion, the printer color processing unit 302 outputs the same CMYK image data as that in step S214 to the line width correction unit 403.

In step S315, the line width correction unit 403 subjects the multiple-valued CMYK image data generated in step S314 to the line width correction, based on the correction parameter stored in the correction value storage unit 406 in step S121. A color (a correction color of a line width), a direction (a correction direction of a line width), a line width (a correction amount of a line width), and density (correction density of a line width) can be specified as the correction parameter. In the present exemplary embodiment, the "color" is each color of CMYK; the "direction" is anyone of eight up-down, right-left, and oblique directions; the "line width" is a correction amount specified in a pixel unit; and the "density" is pixel density adding a dot. The correction amount of the line width in actual printing depends on resolution of input data of the line width correction unit 403. Specifically, when the printing density is 600 dpi, correction is enabled in a unit having a 1 dot size of about 42 μm. When the printing density is 1200 dpi, correction is enabled in a unit having a 1 dot size of about 21 μm. The line width correction unit 403 transmits the CMYK image data subjected to the line width correction to the gamma correction unit 404.

In step S316, the gamma correction unit 404 subjects the CMYK image data subjected to the line width correction in step 315 to one-dimensional LUT processing for each CMYK, in order to correct a change in a printer density characteristic caused by environmental changes due to a temperature and humidity, or endurance, thereby performing gradation correction. The gamma correction unit 404 transmits the CMYK image data subjected to the gradation correction to the image forming unit 405.

In step S317, the image forming unit 405 converts the CMYK image data subjected to the gradation correction in step S316 into the halftone image of N (integer) bits suitable for the printer, and sends the halftone image to the printer unit 111. The printer unit 111 receiving the halftone image executes image formation.

In the above present exemplary embodiment, the copy function of steps S210 to S217 is not subjected to the line width correction. However, the scanner image processing unit 108 may subject each data included in the image data read by the scanner unit 107 to image region segmentation for a plurality of attributes, and the line width correction unit 403 may subject only data of a character attribute to the line width correction between steps S214 and S216 based on the attributes after the image region segmentation.

In the above exemplary embodiment, the PDL data received by the PDL processing unit 401 is subjected to the image region segmentation in the execution of the print function of steps S310 to S317. However, when the PDL processing unit 401 receives the PDL data subjected to no image region segmentation, the PDL processing unit 401 may subject the PDL data to the image region segmentation, and subject the data of the character attribute to the line width correction.

Only the data of the character attribute of the PDL data subjected to the image region segmentation in the present exemplary embodiment is subjected to the line width correction. However, data of a graphic attribute or a photograph attribute may be also subjected to the line width correction. In this case, the data may be subjected to the line width correction with the correction parameter, that is, the correction amount of the line width changed, according to the attribute of each data subjected to the image region segmentation.

As described above, the present exemplary embodiment compares the reference profile in consideration of the read characteristic (a degree of image blurring) of the scanner with the line width profile. This enables the line width correction in consideration of blurring. Exact line width correction is enabled by setting a suitable correction parameter. Therefore, faithful reproducibility of the thin line and the character to be printed is improved.

In the present exemplary embodiment, the number of reference profiles prepared for the thin line of one line width is 1. However, a plurality of reference profiles may be prepared in consideration of a modulation transfer function (MTF) characteristic which is the read characteristic of the scanner unit 107. The degree of blurring when the image is read by the scanner unit 107 is digitized as an MTF value by the MTF characteristic of the scanner unit 107. A configuration may store a plurality of reference profiles according to a range of the MTF value using the MTF value, check the MTF value of the scanner unit 107 at periodical or optional timing using a known technique, and switch the reference profiles according to the result. Two types of reference profiles are previously stored as an example. When the MTF value is in a range of 40% to 55%, a reference profile 1 is used. When the MTF value is in a range of 56% to 70%, a reference profile 2 is used. Thereby, the scanner unit 107 having a deteriorated specific environment and endurance can correct the standard of correction and execute the correction even when the degree of blurring in reading the image is changed.

In the first exemplary embodiment, the reference profile in consideration of the characteristic (degree of blurring) of the scanner is previously made from a standard design machine and standard paper. The first exemplary embodiment describes the correction method for maintaining the line width of the thin line and the character which are print-output in a fixed state (a state in designing) using the reference profile. However, some users may desire correction of a line width according to a set state of the image processing apparatus and paper uniquely used. When preferences for the line width are different depending on the users, it is necessary to enable print corrected to be thicker (or thinner) than the design state. In view of the above description, the target (reference profile) of the line width correction described in the first exemplary embodiment can be desirably generated according to a use's use situation and preference. A second exemplary embodiment of the present invention provides a method for generating and selecting the reference profile to the user. There will be described a method for correcting a line width according to a set situation used by a user and paper, and a method for correcting a thin line to be corrected to an optional line width according to a user's preference.

Since a block diagram of a hardware configuration of an image processing apparatus according to the present exemplary embodiment is similar to that of the first exemplary embodiment, the description thereof is omitted. Unless otherwise noted, the present exemplary embodiment has the same configuration as that of the first exemplary embodiment.

FIG. 12 is an exemplary processing flow chart of the second exemplary embodiment executed by the correction processing unit 112. This processing is executed by a user's instruction as in the first exemplary embodiment. Hereinafter, an example for registering a reference profile in both main scanning and sub-scanning directions for a thin line of "black, 2 dot lines, 100% density" will be described. The reference profile can be registered by performing same operation for other color, a line width, middle density, and an oblique line.

Figure 13:
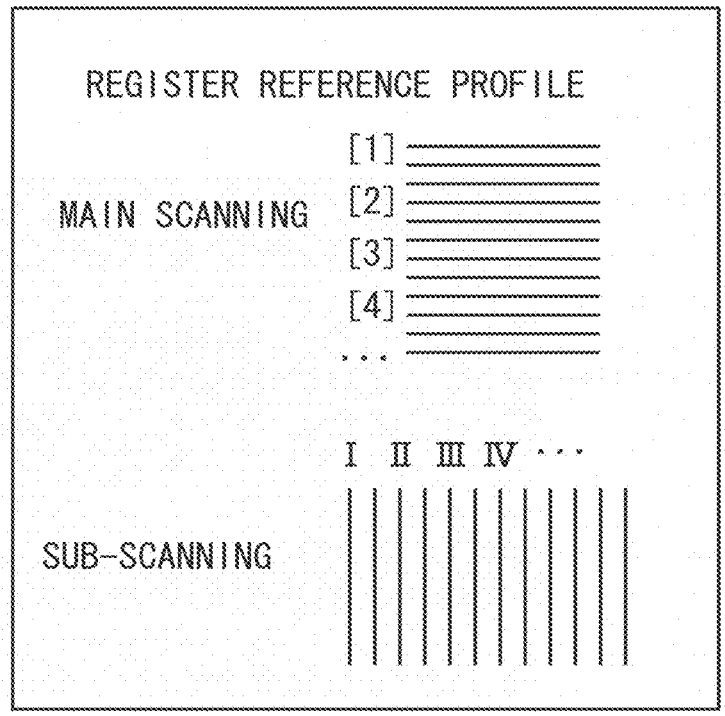
FIG. 13 illustrates an example of a chart for registering a reference profile.

In step S411, the chart output unit 202 outputs output data of a chart for registering a reference profile, for example, as illustrated in FIG. 13 to the printer unit 111 based on the candidate parameter stored in the chart storing unit 201. The printer unit 111, receiving the output data of the chart for registering the reference profile, prints the chart for registering the reference profile as illustrated in FIG. 13. Since the user inputs the numbers of line width patches in step S412 to be described below at this time, the numbers are previously applied to the line width patches of the chart for registering the reference profile. Next, the line width patches of the chart for registering the reference profile are subjected to the same processing as that of step S111. Specifically, the line width patch [2] is obtained by adding a 1 dot line having density of 100% downward for the thin line (in the example, 2 dot lines) to be corrected, of the line width patch [1]. The line width patch [3] is obtained by adding 2 dot lines having density of 100% upward and downward, respectively, for the thin line of the line width patch [1]. Thus, the chart for registering the reference profile includes the line width patches gradually subjected to thickening processing, and is the same as the chart for line width correction of the first exemplary embodiment.

Figure 14:
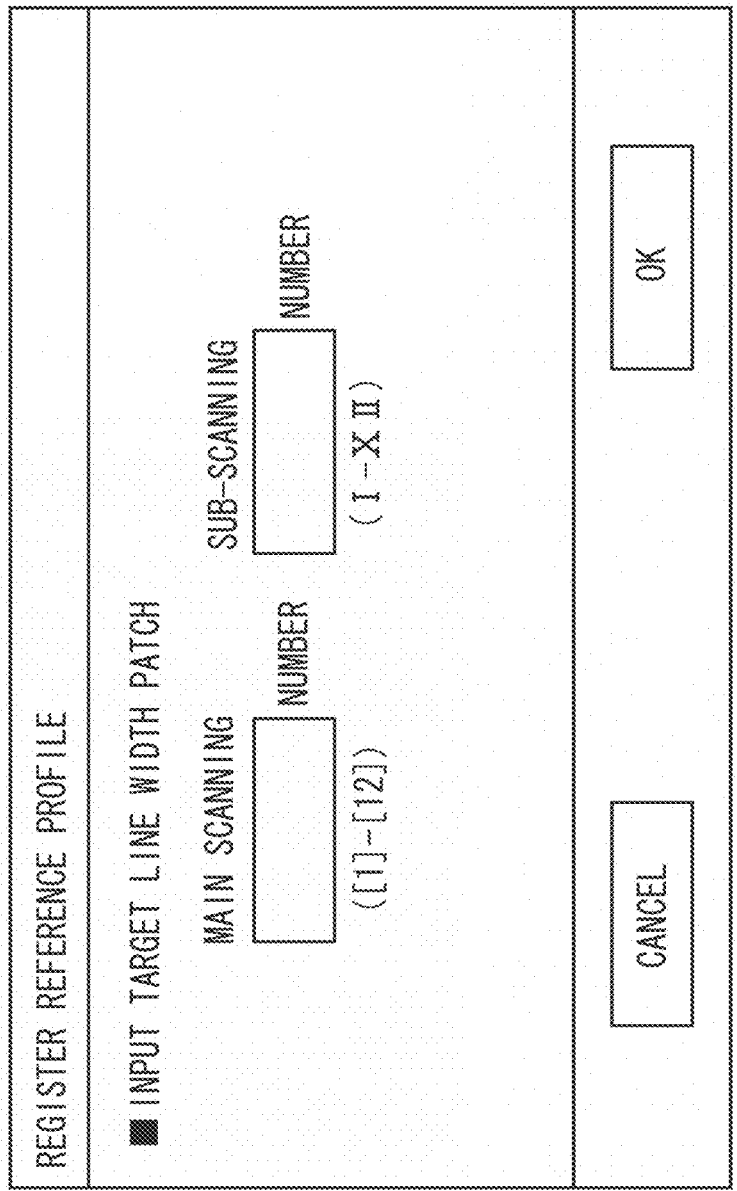
FIG. 14 illustrates a printing environment setting item in reference profile registration.

In step S412, the display unit 105 displays a printing environment setting item as illustrated in FIG. 14. At this time, the display unit 105 additionally registers the line width patch of what number of the chart for registering the reference profile as a new target (reference profile) for the user or displays the line width patch with a message, and prompts the user to input the line width patch number. The operation unit 106 waits for the input of the line width patch number from the user, and acquires the input line width patch number. Although the input of the line width patch number is required for both the main scanning direction and the sub-scanning direction in the example illustrated in FIG. 14, the example is not limited thereto.

In step S413, the display unit 105 instructs the user to put the chart for registering the reference profile output from the printer unit 111 in step S411 on the platen of the scanner unit 107 as in step S112, and prompts a reading operation. The image acquisition unit 203 acquires the RGB image data read by the scanner unit 107.

In step S414, the luminance extraction unit 204 extracts the luminance data from the read RGB image data as in step S113.

In step S415, the profile generation unit 205 subjects the line width patch corresponding to the line width patch number acquired from the operation unit 106 in step S412 to the next processing. Specifically, the profile generation unit 205 scans in the X axis direction (or the Y axis direction) as in step S114, obtains the summation of the luminance values of the pixels, and divides the summation by the number of the pixels to calculate the average luminance value. Herein, a patch is intended in both main scanning and sub-scanning.

In step S416, the profile generation unit 205 determines whether the chart for line width correction is skewed as in step S115 of the first exemplary embodiment. When the chart for line width correction is skewed, the display unit 105 displays a message prompting the user to adjust a placement position of the chart for line width correction, and requests the user to reread the chart for line width correction processing. The processing from step S413 is executed again. When the chart for line width correction is not skewed, the processing proceeds to step S417.

In step S417, the profile generation unit 205 executes the following processing. The profile generation unit 205 plots the average luminance values calculated in step S415 for the line width patch corresponding to the line width patch number acquired by the operation unit 106 in step S412 for the coordinate positions on the Y axis in the Y axis direction (the sub-scanning direction), and generates the line width profiles. Similarly, the profile generation unit 205 plots the average luminance values calculated in step S415 for the coordinate positions on the X axis in the X axis direction (the main scanning direction), to generate the line width profiles.

In step S418, the profile selection unit 206 additionally registers the line width profiles generated in step S417 as a new reference profile in the reference profile storing unit 208. The reference profile storing unit 208 stores the new reference profile. Thereafter, when the correction processing (calibration) described in the first exemplary embodiment is performed, the new reference profile is used as the reference profile. The originally used reference profile is left stored in the reference profile storing unit 208 in order to initialize the system and to reset the reference profile.

A configuration may display a screen prompting paper type input as illustrated in FIG. 17 on the display unit 105 when the chart is output in step S411, generate the reference profile on the corresponding paper, and register the reference profile for each paper type in step S418.

When the new reference profile is registered in step S418, a modulation transfer function (MTF) value of a scanner may be measured, to register the new reference profile as the reference profile corresponding to the MTF value.

As described above, the present exemplary embodiment provides a unit for generating and selecting the reference profile to the user. Thereby, it is possible to perform the line width correction according to the set situation used by the user and the paper type, and to correct the thin line to be corrected, to the optional line width according to a user's preference.

In the first exemplary embodiment, the reference profile in consideration of the characteristic (blurring) of the scanner is previously prepared. The first exemplary embodiment describes the correction method for maintaining the line width of the character and the thin line of print output in the fixed state (the state in designing) using the reference profile. The second exemplary embodiment provides a unit for generating and selecting the reference profile to the user, and describes the method for correcting the thin line to be corrected, to the optional line width according to a user's preference.

The printing characteristic of the image transferred on the paper is different depending on the types of paper to be used. More particularly, since a degree of brilliance, a thickness, and a fixing characteristic of the paper to be used are different even when image formation is performed on the same imaging condition, the final image density on the paper is different.

Figure 15:
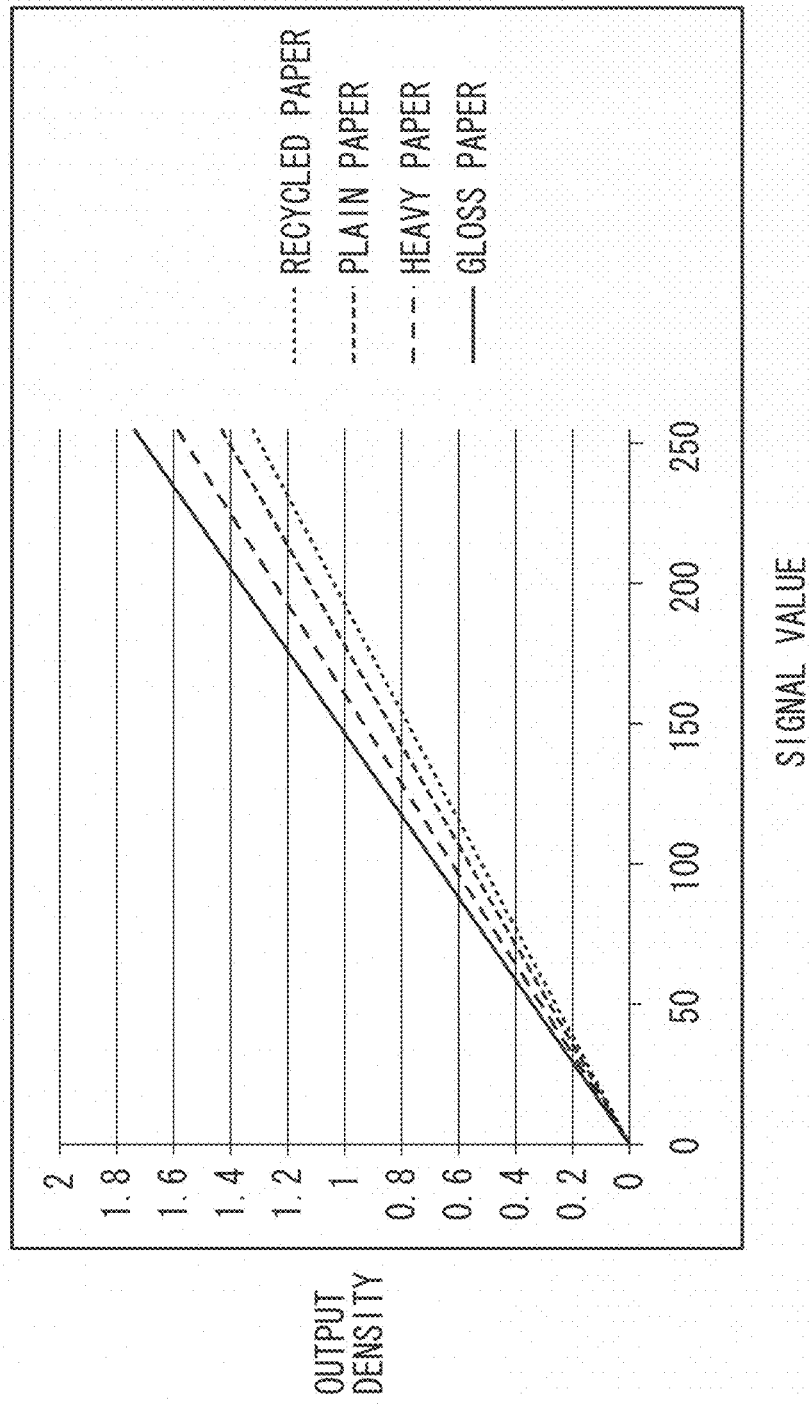
FIG. 15 illustrates an example of ideal density characteristics of various types of paper.

FIG. 15 illustrates an example of ideal density characteristics of various types of paper (recycled paper, plain paper, heavy paper, gloss paper). In FIG. 15, the horizontal axis represents a signal value of output density when the printer unit 111 performs image formation, and the vertical axis represents output density to be actually printed. A development condition and a fixing condition are controlled according to a degree of brilliance and a thickness of paper to be used, in an image forming apparatus. However, as described above, the density characteristics are different depending on the paper to be used. For example, as illustrated in FIG. 15, when the heavy paper and the gloss paper are subjected to printing, the heavy paper and the gloss paper have the maximum density higher than that of the plain paper. However, when the recycled paper is subjected to printing, the recycled paper tends to have the maximum density lower than that of the plain paper. The ideal density characteristics of the various types of paper are density characteristics linear or close to the maximum density, and thereby the most number of gradations are secured. Accordingly, a higher image quality can be obtained. It is ideal that the ideal density characteristics are characteristics linear to density as described above in that the most number of gradations are secured. However, the density characteristics having a linear brightness characteristic and color difference characteristic may be ideal when putting emphasis on discrimination of brightness or a color difference.

When the line width patches of the chart for line width correction described in the first exemplary embodiment and illustrated in FIG. 6A in light of the above description are printed, the densities of the thin lines are different depending on the types of paper to be used. When the thin lines are read by the scanner, the degrees of blurring are also different depending on the contrasting densities of the thin lines. In view of the different degrees of blurring, in a third exemplary embodiment of the present invention, an image processing apparatus and an image processing method capable of performing strict line width correction in different types of paper will be described. When the third exemplary embodiment performs the line width correction using the reference profile in consideration of the characteristic of the scanner, the third exemplary embodiment subjects various types of paper to strict line width correction in consideration of the density characteristic of various types of paper as illustrated in FIG. 15. Specifically, the reference profiles for the various types of paper are stored in the reference profile storing unit 208. The line width correction is performed by switching the reference profiles depending on the type of paper to be subjected to the line width correction. Unless otherwise noted, the configuration of the third exemplary embodiment is the same as that of the first exemplary embodiment.

Figure 16:
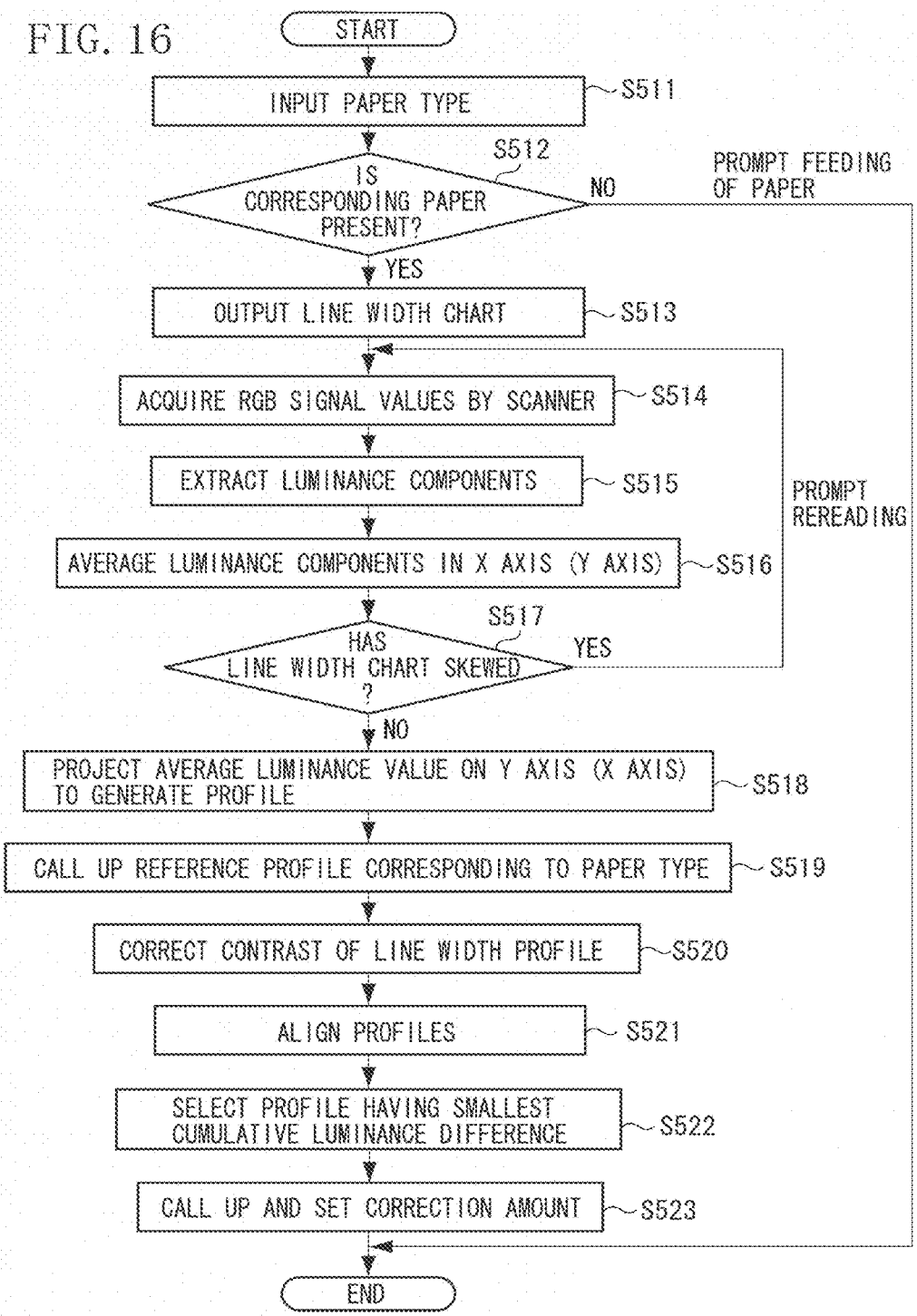
FIG. 16 is an exemplary processing flow chart according to a third exemplary embodiment of the present invention.

FIG. 16 is an exemplary processing flow chart of the third exemplary embodiment executed by the correction processing unit 112. This processing is executed by a user's instruction. The processing flow is executed when the CPU 101 acquires an instruction of line width correction processing via the operation unit 106. Hereinafter, an example in which the reference profile of the thin line of "black, 2 dot lines, 100% density" is registered in both the main scanning and sub-scanning directions will be described as in the first exemplary embodiment. However, the same operation can be performed for other color, a line width, middle density, and an oblique line.

In step S511, as illustrated in FIG. 17, the display unit 105 displays print setting items prompting input of a paper type to be subjected to the line width correction. The operation unit 106 acquires a paper type input by a user.

In step S512, the CPU 101 checks whether the input paper type in step S511 is present in a paper feeding stage of the image forming apparatus. When no paper is present in the paper feeding stage, the CPU 101 displays a message prompting feeding of paper on the display unit 105, and terminates processing.

Since steps S513 to S518 are the same as steps S111 to S116 described in the first exemplary embodiment, the description thereof is omitted.

Figure 18A:
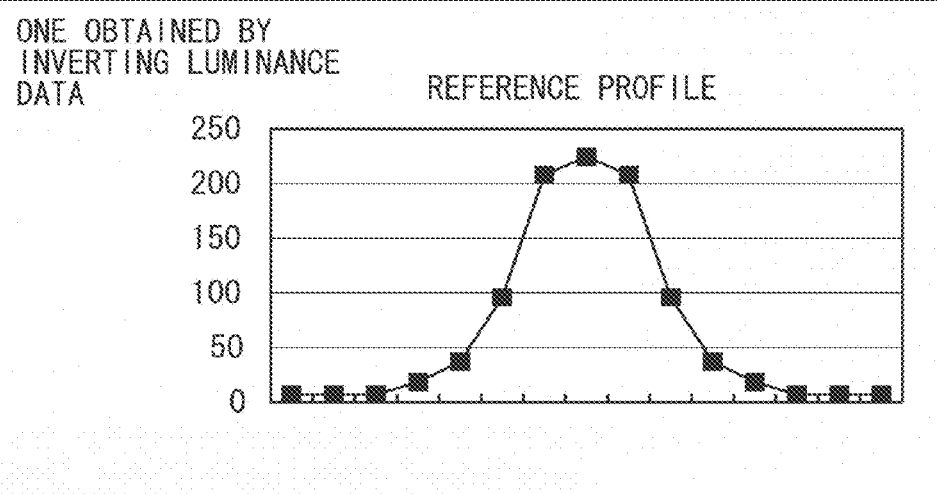
FIGS. 18A and 18B illustrate an example of reference profiles corresponding to various types of paper.
Figure 18B:
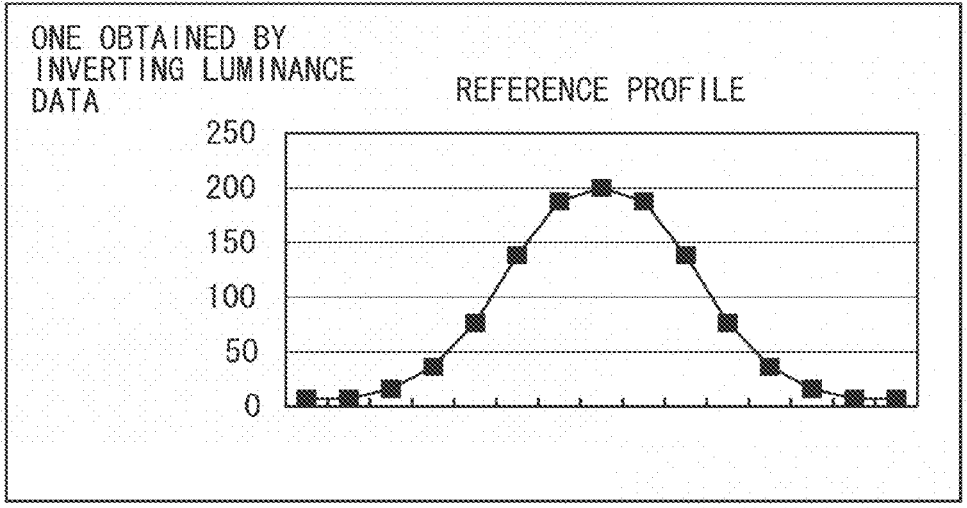

In step S519, the profile selection unit 206 calls up the reference profile corresponding to the paper type input in step S511 by the reference profile storing unit 208. At this time, the reference profile is previously generated in designing for each of various types of paper as in the first exemplary embodiment. For example, as illustrated in FIGS. 18A and 18B, when the recycled paper is subjected to printing, the recycled paper tends to have the maximum density lower than that of the plain paper. As a result, the shape of the profile having the same line width and read and generated by the scanner unit 107 is different. Generally, a contrast (a range of a luminance value) of the recycled paper tends to be smaller than that of the plain paper.

Since steps S520 to S522 are the same as steps S118 to S120 described in the first exemplary embodiment, the description thereof is omitted.

In step S523, the correction amount setting unit 207 sets a correction parameter to a register corresponding to the paper type input in step S511 by the correction value storage unit 406. A register for setting the correction parameter for each of various types of paper is prepared.

As described above, the present exemplary embodiment can switch the reference profiles according to the type of paper subjected to the line width correction, to subject the various types of paper to the strict line width correction. A configuration in which the user can set the reference profile may be employed as in the second exemplary embodiment.

In the present exemplary embodiment, the number of reference profiles prepared for the thin line of one line width in each type of paper is 1. However, a plurality of reference profiles may be prepared in consideration of the MTF characteristic of the scanner unit 107. More specifically, a configuration may store a plurality of reference profiles according to the range of the MTF value, check the MTF value of the scanner unit 107 at periodical or optional timing using a known technique, and switch the reference profiles according to the result. Two types of reference profiles are previously stored for each type of paper as an example. When the MTF value is in a range of 40% to 55%, a reference profile 1 is used. When the MTF value is in a range of 56% to 70%, a reference profile 2 is used. Thereby, the scanner unit 107 having a deteriorated specific environment and endurance can correct the standard of correction and execute the correction even when the degree of blurring when the scanner unit 107 reads an image is changed.

In the exemplary embodiments described above, the line width correction is performed by the same parameter regardless of the line width of a line in an image to be corrected. However, a configuration may detect the line width of each image to be corrected and perform the line width correction using each correction parameter corresponding to the detected line width.

Aspects of the present invention can also be realized by a computer of a system or apparatus (or devices such as a CPU, micro processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-031040 filed Feb. 16, 2011, which is hereby incorporated by reference herein in its entirety.

What is claimed is:

1. An image processing apparatus configured to determine a correction parameter used for line width correction from among a plurality of candidate parameters, the image processing apparatus comprising:
   an output unit configured to output a line width chart obtained by printing a plurality of straight lines subjected to line width correction using the plurality of candidate parameters as line width patches;
   a reading unit configured to read the line width chart output by the output unit to acquire respective images of the line width patches;
   an acquisition unit configured to acquire pixel values of pixels in the images of the line width patches acquired by the reading unit;
   a generation unit configured to generate, for each of the line width patches, a line width profile representing a distribution of the pixel values acquired by the acquisition unit;
   a storing unit configured to store a reference profile representing a distribution corresponding to a predetermined line width; and
   a determination unit configured to determine the correction parameter from among the plurality of candidate parameters based on a comparison between the distribution represented by each line width profile generated by the generation unit and the distribution represented by the reference profile stored in the storing unit.

2. The image processing apparatus according to claim 1, wherein the generation unit generates the line width profile using index values respectively obtained for a plurality of pixel columns parallel to an extension direction of the straight lines printed as the line width patches, based on the pixel values acquired by the acquisition unit; and
   wherein the determination unit compares the index values respectively obtained for the plurality of pixel columns included in the line width profiles with a plurality of index values included in the reference profile, to determine the correction parameter.

3. The image processing apparatus according to claim 2, wherein the generation unit averages the pixel values of the plurality of pixels included in the pixel columns and acquired by the acquisition unit, to respectively obtain average pixel values for the pixel columns, and sets the average pixel values as the index values included in the line width profile.

4. The image processing apparatus according to claim 2, wherein the determination unit calculates a cumulative difference between the index values respectively obtained for the plurality of pixel columns included in the line width profile and the plurality of index values included in the reference profile, and determines the candidate parameter corresponding to the line width profile having the smallest cumulative difference as the correction parameter.

5. The image processing apparatus according to claim 1, wherein the storing unit stores the line width profile generated by the generation unit as the reference profile used for the comparison by the determination unit according to a user's instruction.

6. The image processing apparatus according to claim 1, wherein the storing unit stores the reference profile for each of a plurality of read characteristics, and
   wherein the determination unit selects the reference profile corresponding to read characteristics of the reading unit acquiring images of the straight lines from the plurality of reference profiles, and compares the selected reference profile with the line width profile generated by the generation unit, to determine the correction parameter.

7. The image processing apparatus according to claim 1, wherein the storing unit stores the reference profile of each of a plurality of types of paper on which an image to be subjected to the line width correction is printed, and
   wherein the determination unit selects the reference profile corresponding to a type of paper on which an image to be subjected to the line width correction is printed, from among the plurality of reference profiles, and compares the selected reference profile with the line width profile generated by the generation unit, to determine the correction parameter.

8. The image processing apparatus according to claim 1, further comprising a display unit configured to display a message to a user,
   wherein the generation unit acquires a skew amount of the line width chart read by the reading unit, and displays a reread message of the line width chart by the reading unit on the display unit when the skew amount is equal to or greater than a predetermined threshold value.

9. The image processing apparatus according to claim 1, wherein the acquisition unit acquires luminance values of the pixels as the pixel values.

10. The image processing apparatus according to claim 1, wherein the correction parameter includes adjustment items of color, direction, line width, and density.

11. The image processing apparatus according to claim 1, wherein the correction parameter is different depending on an attribute of an image included in the image to be subjected to the line width correction.

12. The image processing apparatus according to claim 1, wherein the output unit, the reading unit, the acquisition unit, the generation unit, the storing unit, and the determination unit are configured to function when gradation correction processing is performed.

13. An image processing method for determining a correction parameter used for line width correction from among a plurality of candidate parameters, the method comprising:

outputting a line width chart obtained by printing a plurality of straight lines subjected to line width correction using the plurality of candidate parameters as line width patches;

reading the output line width chart to acquire respective images of the line width patches;

acquiring pixel values of pixels in the acquired images of the line width patches;

generating, for each of the line width patches, a line width profile representing a distribution of the acquired pixel values;

determining the correction parameter from among the plurality of candidate parameters based on a comparison between the generated line width profile and a reference profile representing a distribution corresponding to a predetermined line width.

14. A non-transitory computer-readable storage medium storing a program which causes a computer to perform the image processing method according to claim 13.

15. An image processing apparatus configured to correct an image using a correction parameter to print a line of the image in a predetermined line width, the image processing apparatus comprising:

a printing unit configured to print a line width patch;

a reading unit configured to read an image of the printed line width patch;

a generation unit configured to acquire pixel values of pixels in the read image of the line width patch and to generate a line width profile representing a distribution of the acquired pixel values;

a storing unit configured to store a reference profile representing a distribution of pixel values corresponding to the predetermined line width;

a determination unit configured to determine the correction parameter based on a comparison between the distribution represented by the line width profile acquired by the generation unit and the distribution represented by the reference profile stored in the storing unit; and a correction unit configured to correct a line width of an image using the correction parameter determined by the determination unit.

* * * * *